United States Patent [19]

Payne et al.

[11] 4,443,690

[45] Apr. 17, 1984

[54] POWER CONTROL FOR COOKING APPLIANCE WITH TRANSIENT OPERATING MODES

[75] Inventors: Thomas R. Payne, Louisville, Ky.; Alfred L. Baker, Zionsville, Ind.

[73] Assignee: General Electric Company, Louisville, Ky.

[21] Appl. No.: 334,038

[22] Filed: Dec. 23, 1981

[51] Int. Cl.³ .............................................. H05B 1/02
[52] U.S. Cl. .................................... 219/506; 219/486; 219/442; 219/492; 307/39; 340/589
[58] Field of Search ............... 219/492, 494, 453, 464, 219/501, 483, 486, 485, 490, 441, 442; 340/585, 589; 307/117, 39–41

[56] References Cited

U.S. PATENT DOCUMENTS

| | | | |
|---|---|---|---|
| 3,612,826 | 10/1971 | Deaton | 219/553 |
| 3,944,790 | 3/1976 | Tomano et al. | 235/92 T |
| 3,974,472 | 8/1976 | Gould, Jr. | 340/337 |
| 4,044,348 | 8/1977 | Huebscher | 219/453 |
| 4,046,991 | 9/1977 | Sefton et al. | 219/497 |
| 4,334,147 | 6/1982 | Payne | 219/486 |
| 4,369,354 | 1/1983 | Goedecke et al. | 219/483 |

OTHER PUBLICATIONS

"Elektro GmbH", 3/1981, Busch-Jaeger, European Trade Show.

Primary Examiner—M. H. Paschall
Attorney, Agent, or Firm—H. Neil Houser; Radford M. Reams

[57] ABSTRACT

A power control system for a heating element in a cooking appliance having a plurality of possible power settings which provides transient Fast-Heat and Fast-Cool operating modes initiated in response to user-initiated changes to higher or lower appliance power settings, respectively, to reduce the response required for the heating element temperature to reach the operating temperature associated with the new power setting. Approximate heating element temperature information is provided to the control system by an energy counter which is incremented at a rate which is approximately proportional to the rate of increase of the heating element when energized at the power level being implemented. This information is used to prevent initiation of a transient mode if the temperature of the element when the change in setting is made is such that operation in that mode is likely to overshoot the desired new operating temperature.

13 Claims, 21 Drawing Figures

FIG. 17 HEATER ENERGY COMPARE ROUTINE

POWER CONTROL FOR COOKING APPLIANCE WITH TRANSIENT OPERATING MODES

CROSS REFERENCE TO RELATED APPLICATIONS

This application is related to the following commonly-assigned, copending application: Ser. No. 334,039, "Power Control for Cooking Appliance Incorporating Heater Energy Counter," filed in the name of Thomas R. Payne. The disclosure of the above noted application is hereby incorporated by reference.

BACKGROUND OF THE INVENTION

This invention relates generally to a control arrangement for resistive heating elements, and more particularly to a control arrangement for resistive heating elements used as surface heating units in cooking appliances such as ranges.

In controlling the power applied to a heating element employed as a surface element for a range or cooktop, it is advantageous to know the temperature of the heating element. The conventional approach to monitoring temperature has been to employ a temperature sensor placed beneath the cooking utensil containing the food being heated. This information is used primarily to provide a rapid and reasonably accurate response to changes in the power setting for the heating element. Typically, the sensor is deployed in a closed loop feedback control arrangement with control loop parameters selected to provide rapid response to operator power setting selections. This approach produces satisfactory results; however, such sensors add significant cost to the appliance. Because of this cost, ranges with multiple surface units typically employ, at most, one surface unit with a sensor in a closed loop control system. The other surface units are operated in an open loop mode with no means of taking element temperature into account when controlling element operation. The operator simply makes a power setting selection and the heating element is operated at the corresponding power level regardless of the actual temperatures of the element, utensil or food being cooked.

The open loop arrangement is attractive from a cost standpoint and works satisfactorily once the element has reached a steady state operating temperature. However, the response of such systems to changes in power setting is relatively slow. Considerable time may elapse following changes during which the element is either cooler or hotter than the desired cooking temperature. It is during these transient periods that the closed loop approach is most convenient.

For example, assume the surface unit is at room temperature and the operator wishes to operate at low boil temperature. The low boil setting is selected. With closed loop control, the applied power is varied in accordance with sensed temperature to provide a relatively rapid response. However, with open loop control, the element is simply energized at the low boil power level. A relatively long period of time is required for the surface unit to get to the desired steady state operating temperature. Similarly if the operator changes from a high heat setting to a low heat setting with closed loop control, the power applied varies with sensed temperature for rapid response; with open loop control, the same power input for the low setting will be maintained as if the element were being energized from room temperature and it will require a relatively long period of time for the heating unit to cool to the desired lower steady state temperature.

Thus, an open loop control arrangement which provides the fast response advantages of the conventional closed loop control arrangement without need for the relatively costly temperature sensors typically employed in such arrangements would be highly desirable.

Accordingly, it is a principal object of the present invention to provide a power control system for household cooking appliances employing resistive heating elements which reduces the time required for the heating element temperature to reach the new operating temperatures in response to changes in the selected power setting for the heating element without temperature sensor feedback.

SUMMARY OF THE INVENTION

A power control system for controlling the power output of a heating element in a cooking appliance in response to a power setting selected by the operator from a plurality of available power settings is provided.

The power control system includes power control means for operating the heating element at different power levels in response to the selection of different ones of the power settings. Approximate heating element temperature information is provided by an energy counter which is incremented at a rate which is approximately proportional to the rate of increase of the heating element temperature when energized at the selected power setting.

The power control means further includes transient means responsive to changes in the selected power setting and the energy counter which operates the heating element at a power level other than the operator selected power level for a relatively short period of time following a change in power setting as a function of the count of the energy counter prior to operating the heating element at the selected power setting, thereby reducing the response time required for the heating element temperature to reach the operating temperature associated with the new power setting.

In accordance with one form of the invention, the transient means includes fast-heat means which operates the heating element at a fast-heat power level which is higher than the selected power level for a brief period prior to operating the heating element at the selected level in response to a change to a higher power setting when the count of the energy counter is less than a predetermined reference value corresponding to a fast-heat threshold temperature. A count of the energy counter greater than the reference value signifies that the heating element temperature is above the fast-heat threshold temperature. The element is not operated at the fast-heat power level under such conditions in order to avoid overshooting the desired new operating temperature as could occur if the heating element is operated with fast-heat power level when the element temperature is already above the threshold temperature at the fast-heat power level.

The transient means further includes fast-cool means which operates the heating element at a power level lower than the selected power level in response to a change to a lower power setting when the count of the energy counter is greater than a second predetermined threshold temperature. A count of the energy counter less than this second reference value signifies that the heating element is operating at a temperature lower than the fast-cool threshold temperature. The heating element is not operated at the fast-cool power level under such conditions so as to avoid temporarily operating the heating element at a temperature lower than the desired operating temperature.

While the novel features of the invention are set forth with particularity in the appended claims, the invention, both as to organization and content, will be better understood and appreciated from the following detailed description taken in conjunction with the drawings.

DETAILED DESCRIPTION

A. Overview

Figure 1:
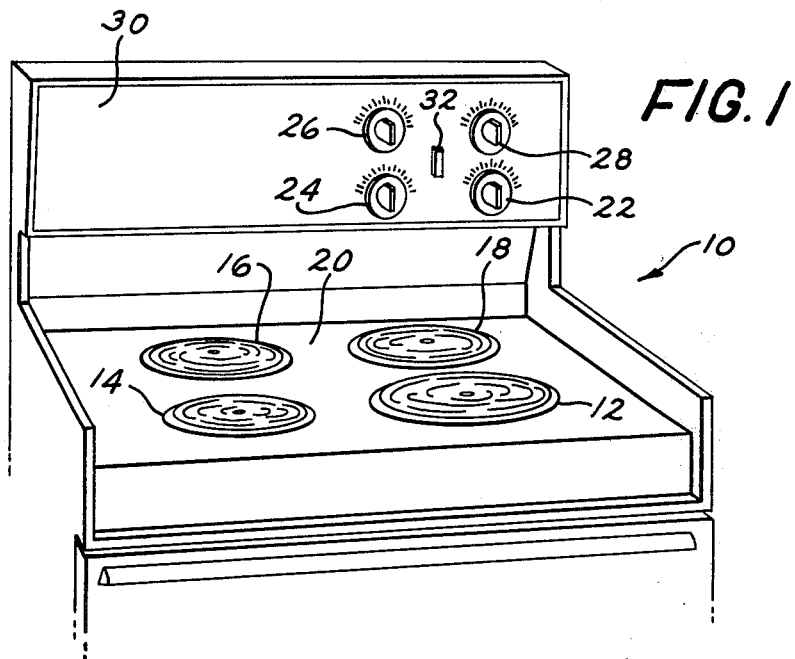
FIG. 1 is a front perspective view of a portion of an electric range embodying the control arrangement of the present invention.

FIG. 1 illustrates an electric cooking range 10 incorporating a control arrangement embodying the present invention. Range 10 includes four conventional electric surface resistance heating elements 12, 14, and 18 supported from a substantially horizontal support surface 20. Manually operable rotary control knobs 22, 24, 26 and 28 are mounted to control panel 30. Control knobs 22, 24, 26 and 28 enable the user to select the desired power level for heating elements 12, 14, 16 and 18, respectively. A signal light 32 is mounted to horizontal surface 20 to provide a visual indication to the operator that at least one of the heating elements is relatively hot.

Figure 2:
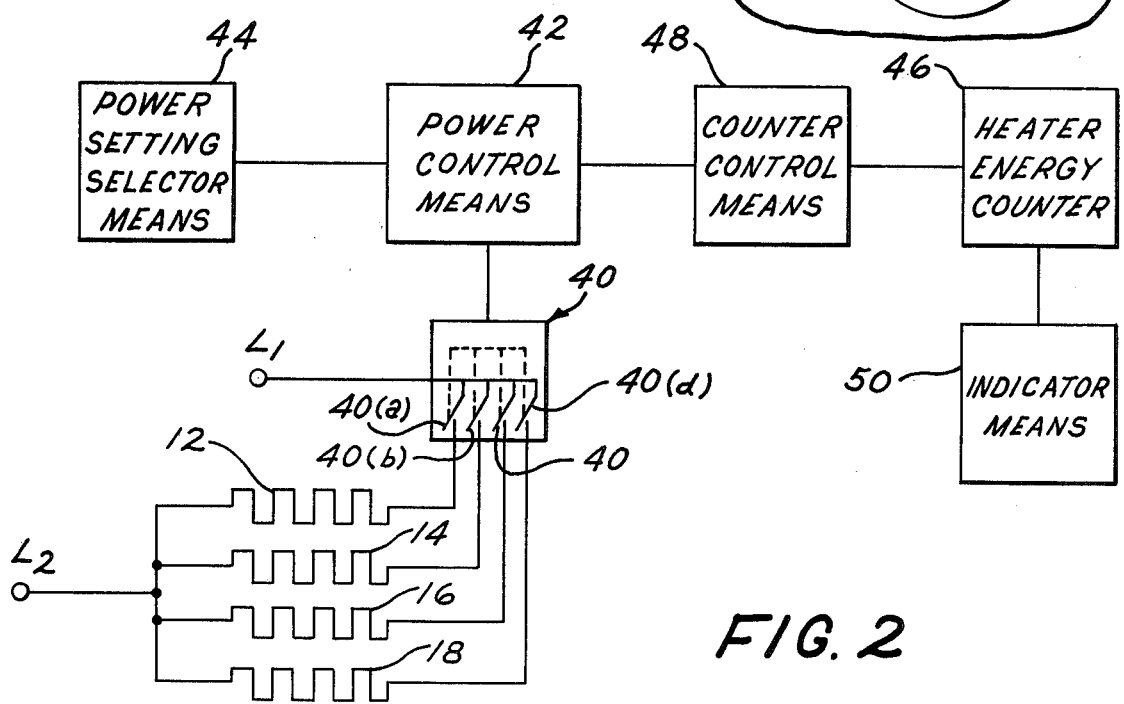
FIG. 2 is a greatly simplified functional block diagram of the control arrangement of the present invention.

A generalized block diagram of the control arrangement for range 10 of FIG. 1 is shown in FIG. 2 wherein the heating elements 12, 4, 16 and 18 are energized by standard 60 Hz AC power signal which can be either 120 or 240 volts supplied to terminals L1 and L2. Elements 2, 14, 16 and 18 are connected electrically in parallel across lines L1 and L2. Power to the heating elements is controlled by switch means 40 connected in series with the heating elements. Switch means 40 includes separate switch means 40(a)-40(d) in series with each of the heating elements 12, 14, 16 and 18, respectively, to permit independent control of power to each of the heating elements. The switch means for each element is switched into and out of conduction in accordance with control signals generated by power control means 42.

Figure 3:
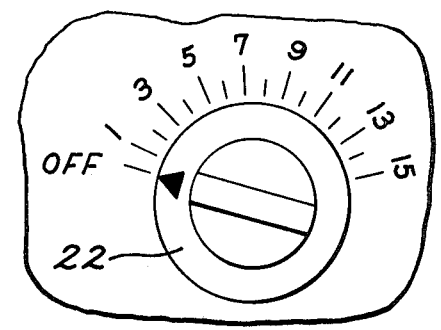
FIG. 3 is a greatly enlarged view of a portion of the control panel of the appliance of FIG. 1 showing the details of one of the control knobs thereof.

Power control means 42 generates power control signals in accordance with the power setting selected by the operator for each heating element. Power setting selection means 44 provides power level control signals to power control means 42 representating the settings selected by manual manipulation of control knobs 22 through 28 of FIG. 1. As best seen in FIG. 3, each of control knobs 22-28 enable the user to select one of 16 available discreet power settings including an OFF power setting for the corresponding heating element. Clearly, a greater or fewer number of power settings could be provided. Also, alternative means for power setting selection by the user, for example, a digital keyboard, could be employed.

Power control means 42 controls the percentage of time power is applied to each of the heating elements 12 in accordance with the power level setting selected by the operator.

In the illustrative embodiment, a predetermined control period comprising a fixed number of control intervals is employed as the time base for power control. Each heating element is switched into conduction for a particular number of control intervals during each control period, based on the corresponding operator selected power setting. The ratio of conductive control intervals to the total control intervals in the control period, expressed as a percentage, is referred to herein-after as the duty cycle. Each control interval comprises eight cycles of the standard 60 Hz 240 volts AC power signal, corresponding to a period of approximately 133 milliseconds. Each control period comprises 128 control intervals corresponding to a period of approximately 17 seconds duration. The durations for the control interval and for the control period were selected to provide a satisfactory range of power settings for desired cooking performance, which could be implemented using relay switching devices and programmed to make efficient us of the microprocessor memory. It is understood that control intervals and control periods of greater or lesser duration could be similarly employed.

In carrying out the control scheme, the percentage of ON time or duty cycle for each power level is obtained by switching the particular heating element into conduction for a predetermined number of control intervals during each control period. TABLE I shows the percentage ON time and the number of conductive control intervals per control period for each of the 15 power settings. The duty cycles for each of the power cycles was determined empirically to provide the desired range of cooking temperatures for satisfactory cooking performance. It is understood that other duty cycles could be similarly employed.

Counter control means 48 is further operative to decrement energy counter means 46 at a predetermined decrement rate in response to the selection of the OFF power setting. This decrement rate is selected to be approximately proportional to the actual rate of decrease of the heating element temperature during this cool-down phase. By incrementing and decrementing heater energy counter 46 in this manner, the count of the heater energy counter means 46 i approximately proportional to the temperature of the heating element, thereby providing an approximate measure of heating element temperature without need for a sensor. The increment and decrement rates per control period and maximum counts are shown in Cols. 6 and 7, respectively, of TABLE I for each of the power settings. These values were selected by a process of empirical

TABLE I

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER INCREMENT RATE (COUNTS PER ENERGIZED CONTROL INTERVAL) | COL. 6 HEATER ENERGY COUNTER INCREMENT RATE (COUNTS PER CONTROL PERIOD) | COL. 7 MAX. HEC COUNT |
|---|---|---|---|---|---|---|
| 0 | 0 | 0 | 128 | $-\frac{1}{2}$ | $-64$ | — |
| 1 | 2 | 3 | 125 | $5\frac{1}{3}$ | 16 | 4096 |
| 2 | 3 | 4 | 124 | $5\frac{1}{3}$ | $21\frac{1}{3}$ | 4096 |
| 3 | 5 | 7 | 121 | $5\frac{1}{3}$ | $37\frac{1}{3}$ | 4096 |
| 4 | 8 | 10 | 118 | $5\frac{1}{3}$ | $53\frac{1}{3}$ | 4096 |
| 5 | 11 | 14 | 114 | 4 | 56 | 5120 |
| 6 | 15 | 18 | 110 | 4 | 72 | 5120 |
| 7 | 20 | 26 | 102 | 4 | 104 | 5120 |
| 8 | 26 | 33 | 95 | $2\frac{2}{3}$ | 88 | 6144 |
| 9 | 33 | 42 | 86 | $2\frac{2}{3}$ | 112 | 6144 |
| 10 | 41 | 53 | 75 | $2\frac{2}{3}$ | $141\frac{1}{3}$ | 6144 |
| 11 | 50 | 64 | 64 | 2 | 128 | 8192 |
| 12 | 60 | 80 | 48 | 2 | 160 | 8192 |
| 13 | 72 | 96 | 32 | 2 | 192 | 8192 |
| 14 | 85 | 112 | 16 | 2 | 224 | 8192 |
| 15 | 100 | 128 | 0 | 2 | 256 | 8192 |

It will be recalled that a principal object of the present invention is to provide a power control system for cooking appliances which provides a relatively rapid response to changes in power setting without using a temperature sensor in a closed loop control arrangement. To this end a heater energy counter 46 is provided for each heating element to provide approximate temperature information without a sensor. Counter 46 is incremented in such a way that the count of the counter is approximately proportional to the temperature or more fundamentally to the relative energy balance of the heating element.

Counter control means 48 responds to power control means 42 to selectively increment energy counter means 46 at one of a plurality of possible increment rates, each of which is approximately proportional to the rate of increase of the heating element temperature during the transient heat-up phase when the temperature of the heating element is rising to its desired operating temperature. The particular increment rate selected is determined by the power setting selected. Counter control means 48 is further operative to discontinue incrementing the energy counter 46 when the count of the counter at least equals a selected one of a plurality of maximum counts, each of which is approximately proportional to the steady state heating element operating temperature for corresponding power settings. The particular maximum count selected from this plurality of maximum counts is likewise determined by the power setting selected by the operator.

testing directed to finding values which provide satisfactory performance for the particular heating element. It is to be understood that the particular rates selected depend upon the characteristics of the heating element itself as well as the duty cycle at which it is operating. Thus, rates should be empirically determined for the particular system in which the counter arrangement is to be used.

The information provided by heater energy counter 46 may be useful to the control system for performing a variety of functions. It may be desirable, for instance, to initiate the performance of a certain operating function when a certain operating condition which can be characterized by a certain energy level or temperature level exists. This condition can be detected for purposes of initiating the function by comparing the count of energy counter 46 to a empirically determined reference value. The desired function can then be initiated when the desired relationship is detected between the count and the reference value.

Indicator means 50 generates a signal detectable by the operator of the appliance signifying that the temperature of at least one of the heating elements is relatively hot. This is accomplished by comparing the count of heater energy counter 46 to a reference value selected to correspond to a particular temperature above which the heating element is uncomfortably hot to the touch. When the count at least equals this reference value, indicator means 50 generates a warning signal. In the illustrative embodiment, indicator means 50 serves to energize a single indicator light 32, thereby providing visual signal to the user that at least one of the heating elements is relatively hot. It is to be understood that a separate light for each heating element could readily be used as well. Also, other means for indicating a condition such as an audio signal generating means could be similarly employed. A significant advantage of this arrangement is that the indicator light remains on even after the heating element is turned off until the heater energy counter decrements down to the reference value, thereby providing an indication to the operator that the heating element remains hot even though the element has been turned off and is no longer being energized.

The control arrangement of the present invention uses the heater energy counter information in implementing certain transient operating modes designated fast-heat and fast-cool. These modes are provided to reduce the time required for the heating element temperature to respond to changes in the power level selection.

Generally speaking, the fast-heat mode is implemented when the power level selection is changed from one power setting which could be either the OFF or a non-OFF setting to a higher power setting. In this mode, the heating element is energized at a power level higher than the newly selected level for a predetermined relatively short period to reduce the response time required for the heating element temperature to rise to the normal operating temperature associated with the new power setting. In order to avoid overshooting the steady state operating temperature for the newly selected power setting, it is not desirable to initiate the fast-heat operating mode when the heating element is already operating at a temperature higher than a certain predetermined fast-heat threshold temperature. Thus, before initiating the fast-heat mode, a check is made to determine if the count of the heater energy counter exceeds predetermined threshold reference value or count which is approximately proportional to the fast-heat threshold temperature. If not, the fast-heat mode is initiated and power control means 42 proceeds to operate the heating element in the fast-heat mode. If the count exceeds the reference value, the fast-heat mode is not initiated.

Also, it may be desirable not to initiate the fast-heat mode if the power setting selected is such a low setting that operation in the fast-heat mode would cause the heating element temperature to overshoot the desired temperature. To this end, the control system can be arranged to only implement the fast-heat mode when the newly selected power level is higher than a predetermined level above which it can be carried out without overshoot.

The fast-cool mode, generally speaking, is implemented when the power setting selection is changed from one power setting to a lower power setting. In this mode the heating element is energized at a power level lower than the newly selected level for a predetermined period of time to reduce the time required for the heating element temperature to decrease to the lower operating temperature associated with the newly selected power setting. As in the fast-heat mode, there are certain conditions under which it would be undesirable to implement the fast-cool mode. Specifically, when the temperature of the heating element is already below a certain predetermined fast-cool threshold temperature at the time the lower power level setting is selected, operation in the fast-cool mode may overshoot, causing the heating element temperature to temporarily drop below the new desired operating temperature. To avoid this form of overshoot, the count of energy counter 46 is again checked, this time to determine if the count is less than a second threshold reference value or count which is approximately proportional to the fast-cool threshold temperature. If the count is less than this second threshold reference value, signifying the heating element is already at a relatively low temperature, the fast-cool mode is not implemented; otherwise, control means 42 proceeds to operate the heating element in the fast-cool mode.

As with the fast-heat mode, it may be desirable not to implement the fast-cool operating mode for power settings above a relatively high setting in order to avoid a temporary drop in the operating temperature below the desired new operating temperature. To this end, the control system may be arranged to only implement the fast-cool operating mode when the newly selected power setting is below a predetermined relatively high power setting below which the fast-cool mode can be implemented without overshoot.

In addition to the fast-heat and fast-cool modes, the control arrangement to be described hereinafter in greater detail provides one additional transient mode, Instant On. However, the counter information is not used in implementing this operating mode. Briefly, the purpose of the Instant On Mode is to provide a relatively quick response when the operator changes the power setting of a heating element from OFF to a non-OFF power setting. Since the total control period is on the order of 17 seconds, it is possible that the operator may select a power setting during the latter stages of the control period in which case a period of several seconds could elapse before any power is applied to the heating element, causing the user to wonder whether or not the power selection is entered. To overcome this problem, the Instant On Mode causes the heating element to be operated at the maximum power setting for a predetermined period of time beginning with the next control interval regardless of the actual power setting selected, so that power is applied to the heating element during the very next control interval regardless of where the system is in the control period when the selection is made.

B. Parameter Selection Considerations

Figure 4:
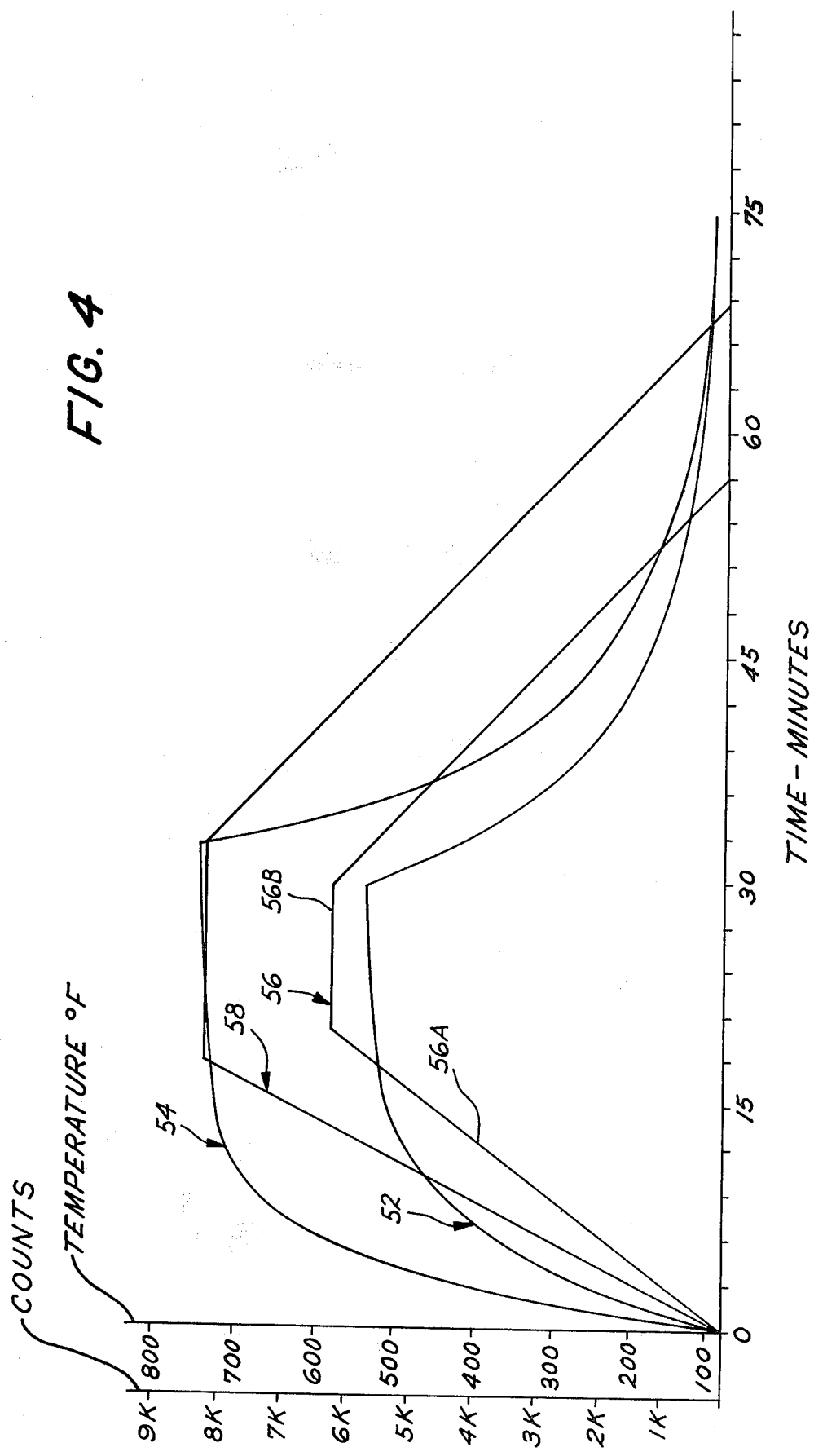
FIG. 4 is a graph depicting representative temperature versus time curves for the heating element of the type employed in the control arrangement of FIG. 2 for various power settings.

The temperature response of resistive heating elements of the type normally used for cooking apparatus when energized at room temperature generally can be characterized by heating curves comprising a heat-up phase and a steady state phase. When power is removed, the temperature response can be characterized by a cooling-down phase. A family of such curves for a typical heating element used as a surface unit in an electric range is shown in FIG. 4 for various power settings. The heating-up phase is represented by that portion of the curve characterized by a relatively rapid increase in heating element temperature; the steady state phase is represented by that portion of the curve characterized by a relatively constant temperature; and the cool-down phase is represented by that portion of the curve characterized by a relatively rapidly decreasing temperature following deenergization of the heating element. Temperatures shown are those measured at the inside of a cooking pan which is in contact with the heating element. The heating element is at room temperature when it is first energized and the appropriate power level is applied until the steady state temperature is reached. The heating element operates at this steady state level until power is removed at which time the heating element cools down to room temperature. To a first degree of approximation for most conventional utensils, the slopes of the heating curves are independent of load conditions. The approximate response to changes in power settings can be determined from these curves by finding the curve corresponding to the new setting, starting from the temperature point representing the temperature of the element when the setting is changed.

The temperature of a heating element reflects the net energy balance of the heating element. When power is initially applied to the heating element at room temperature energy is being added to the heating element from the power supply at a rate greater than the heating element dissipates the energy through radiation and conduction by heat transfer to the surroundings resulting in a net increase in the energy level of the element. This net increase in energy level results in an increase in the temperature of the heating element. Eventually, the heating element reaches a temperature at which it is dissipating energy at a rate equal to the energy being provided from the power supply, at which time the temperature levels off, and the system operates in its steady state phase or mode. When the heating element is deenergized, the heating element dissipates energy resulting in a temperature decrease until the heating element temperature returns to room temperature.

By incrementing and decrementing a counter at rates which approximate the rates at which the net energy balance of the heating element increases or decreases, the count of the energy counter at any point in time is approximately proportional to the net energy level characterized by a particular temperature. Thus, it is possible to empirically determine a counter increment rate for each power setting which is approximately proportional to the rate of temperature increase or energy increase for the heating element for that particular power setting. By incrementing the counter at that rate when that power setting is selected the count of the counter is approximately proportional to the temperature of the heating element.

Curves 52 and 54 represent thermal curves for power settings 8 and 11, respectively. Curves 56 and 58 represent a linearized approximation of the curves for power levels 8 and 11, respectively. The slope of curve portions 56A represents a counter increment rate of 88 counts per control period which is that implemented in the illustrative embodiment for the counter when power, level 8 is selected (see TABLE I). The horizontal portion 56B of the curve represents the maximum count of the counter for the power level selected, which in the illustrative embodiment is set at 6144 for power level 8. The slope of portion 56C represents the rate for decrementing counter 46. In the illustrative embodiment, this rate is 64 counts per control interval.

One technique for implementing the count of the heater energy counter to approximate the temperature of the heating element being subjected to power control of the type utilizing periodic energization of the heating element would be to increment the counter at a certain rate during each control interval when the heating element is energized and decrement the counter during control intervals when it is deenergized so that during any one control period the counter would be incremented during a certain number of the control intervals and decremented during others, the net result at the end of the control period being a net increase or decrease of the counte relative to the beginning of the control interval. One disadvantage of this approach is that it requires a counter having the capacity to count very large numbers. In a preferred form of the invention, an increment rate is selected which provides the desired net increase in the count at the end of each control period representing the approximate increase in temperature of the heating element during that control period for the duty cycle at which the element is operating. This is carried out by incrementing at a relatively slow rate during energized control intervals and holding the count constant during non-energized control intervals.

Figure 5:
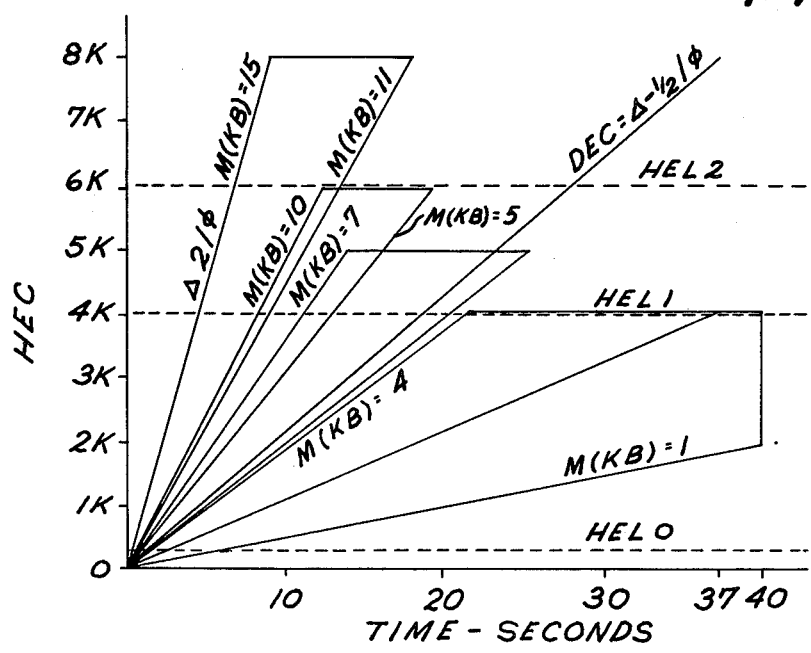
FIG. 5 is a graph depicting the count of the heater energy counter of the control arrangement of FIG. 2 versus time for various power settings.

The graph of FIG. 5 shows the effective increment rate for the various power settings employed in the illustrative embodiment to be described hereinafter. The number of counts which the energy counter is incremented each energized control interval for the various power settings is shown in TABLE 1. It will be noted that the count rate per control interval is higher for the low power settings than for the high power settings. This is done to take into account that the heating element operates more efficiently at low temperatures. That is, energization of the heating element for a given duration of time at low temperature results in a greater increase in temperature than energization of the heating element at a high temperature for the same duration of time. When operating at low settings, the heating element is energized for fewer control intervals per control period and the temperature of the element increases relatively slowly; however, for each energized control interval, the increase in temperature is greater than for the relatively high power setting. At the high power setting, the temperature of the unit increases rapidly to the level at which the temperature increase per control interval is less. Thus, the high rate per interval for low settings and low rate per interval for high settings provides a satisfactory approximation to the actual rate of temperature increase for the various power settings.

As shown in Col. 6 of TABLE I, the effective increment rate per control period does increase with increasing power setting, as would be expected. This difference results from the fact that the number of conductive control intervals per control period increases with an increase in power level. Thus, even though the counter is incremented at fewer counts per conductive control interval, the number of conductive control intervals per control period is much greater for the higher power setting, resulting in a total counter increment rate per control period which increases with increasing power level.

The increment rate per control period is selected to empirically approximate the rate of increase of the heating element temperature for each of the power settings by attempting to linearly approximate the temperature versus time curve for the heating element at each of the power settings. Various approximating techniques could be employed to arrive at the desired increment rate for each power setting, depending upon the degree of accuracy desired. The linear approximations expressed as constant increment rates per control period in TABLE I have been found to provide satisfactory results for the functions performed by the control arrangement of the present invention. It will be observed in the graph of FIG. 5 that there are certain overlaps.

This results from a compromise between approximation accuracy and implementation economy. If greater accuracy is desired, rates which are more precisely tailored to each power stting could be empirically determined and readily implemented at the cost of a substantial increase in required microprocessor memory storage capacity.

In the illustrative embodiment, a constant decrement rate is employed for all the power settings. A more accurate approach would be to provide a different rate for each different power setting. This could be readily accomplished; however, it would again require a significant increase in microprocessor memory storage capacity. The accuracy provided by the single constant rate has been found to be satisfactory for performing the functions of the control arrangement of the present invention. As shown in FIG. 5 and also in TABLE I, maximum counts are provided for various power settings 1-4 at a maximum count of 4096, settings 5-7 at a maximum count of 5120, settings 8-10 at a maximum count of 6144, and settings 11-15 at a maximum count of 8192. It has been empirically determined that the maximum counts provide satisfactory approximations of the maximum temperature of the heating element. Obviously, a more accurate approximation would result if a different maximum count were used for each individual power setting. Again, the improved performance would require additional memory storage capacity. It was determined, as a practical matter, that the additional programming code required to implement such a scheme was not justified in view of the satisfactory performance obtained by grouping in accordance with that shown in FIG. 5.

The threshold temperatures and corresponding threshold reference values for energizing the hot light indicator and initiating the various transient modes were empirically chosen to provide the desired operating performance. It was determined that it would be desirable to energize the hot light indicating to the user that the heating element was hot when the temperature of the heating element exceeded a temperature of 110° F. This temperature was selected as a reasonable transition temperature between relatively cool and relatively hot settings. Above this temperature, the heating element is at least uncomfortably hot to the touch. The heater energy count empirically found to be approximately proportional to this temperature for the illustrative embodiment is a count of 256. A threshold temperature above which it is undesirable and unnecessary to implement the fast-heat mode because implementation may cause overshoot, has been empirically determined to be 350° F. A threshold count or reference value of 4096 has been found to be approximately proportional to this temperature for the illustrative embodiment. The Fast-Cool threshold temperature below which it is undesirable and unnecessary to implement the Fast-Cool operating mode has been empirically determined to be 500° F. A threshold count for reference value of 6144 has been empirically found to be approximately proportional to this temperature.

C. Functional Operation of the System

Figure 6:
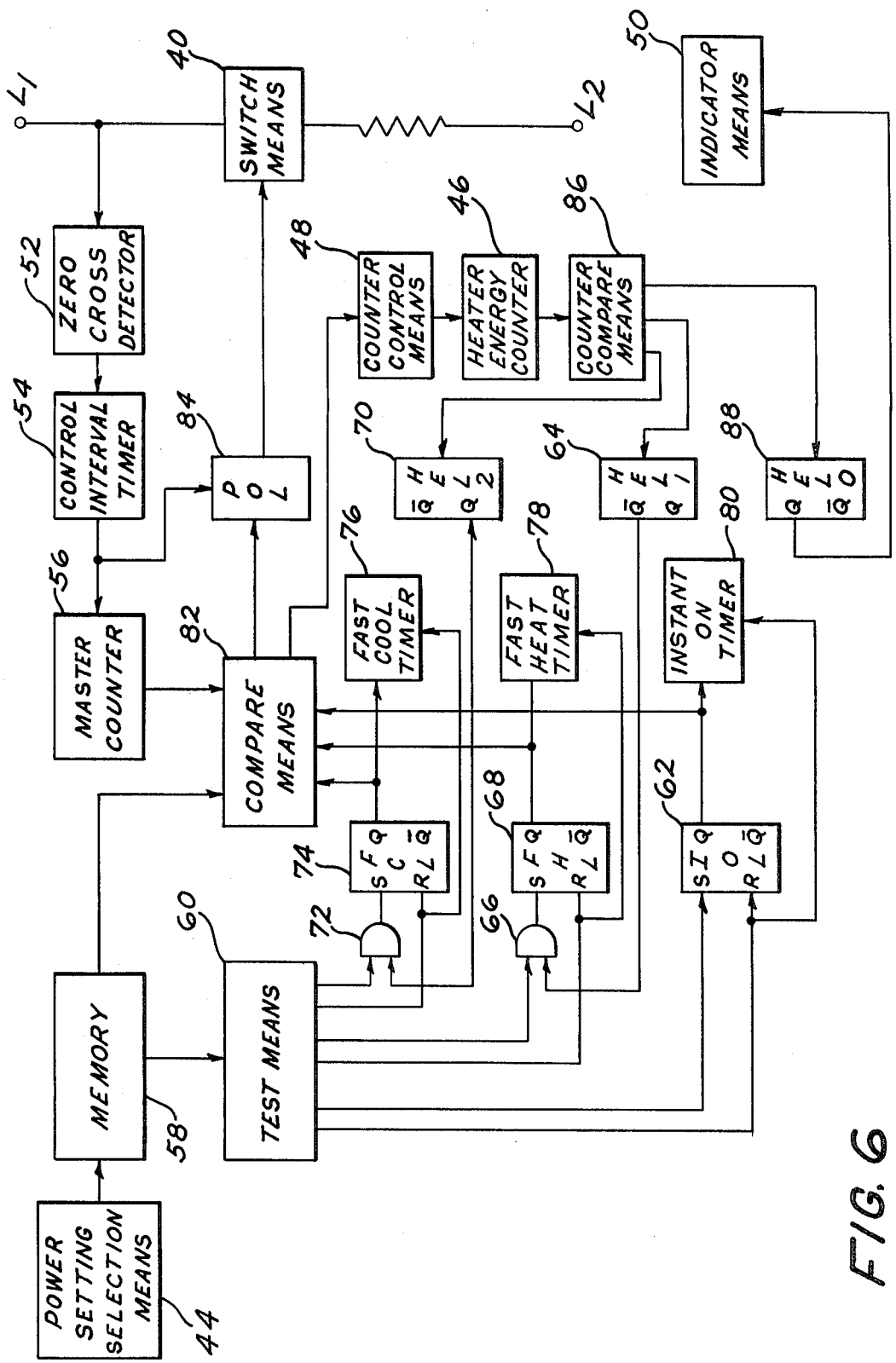
FIG. 6 is a more detailed functional block diagram of the control arrangement of FIG. 2 for a single one of the heating elements.

The functional block diagram of FIG. 6 which illustrates a control system in accordance with the present invention to implement these operating modes for a single heating element, will be referred to in describing in greater detail the functional operation of the control system embodying the control arrangement of the present invention It is to be understood that the operation of the system is the same for multiple heating elements requiring merely a duplication of the control arrangement shown for each additional heating element.

Control system operation is synchronized with the zero crossings of the power signal applied to terminals L1 and L2. Zero crossing detector 52 monitors the power signal and generates a zero crossing pulse upon each detection of a zero crossing of the power signal. The control interval is defined by control interval timer 54 which counts the zero crossings and generates an output pulse once every eight cycles of the power signal corresponding to once every 16 counts or zero crossings. The output pulse from control interval timer 54 marks the beginning of each control interval. Master Counter 56 establishes the duration of each control period by repetitively counting a predetermined number of control intervals and resetting. In the illustrative embodiment, Master Counter 56 counts from zero to 128 and resets, thereby establishing the duration of the control period at approximately 17 seconds. The control logic is completely cycled through once at the beginning of each control interval during which a switch means triggering decision for each heating element is made for that control interval.

In carrying out the power control scheme, the output from power setting selection means 44 representing the current power level selected by the operator is read into memory 58 at the beginning of each control interval. Memory 58 includes a temporary storage location KB (not shown) and a permanent storage location M(KB) for storing control signal data. The newly entered digital control signal from the power level selection means is stored in temporary location KB, until Test Means 60 completes the testing of this signal in a manner to be described. Upon completion of the testing process, the signal stored at KB is transferred to permanent storage location M(KB) in memory where it is retained indefinitely until replaced by a control signal representing a subsequently selected power setting. In the balance of this description, the designations KB and M(KB) are used interchangeably to refer to the memory locations, as well as the signal stored at these locations, as is customary in the art. In each instance, the meaning will be apparent from the context.

In order to determine when to initiate the transient operating modes, Test Means 60 monitors KB to determine whether the new power setting is an OFF setting, the same setting as the previous setting, or a change in the setting to a higher power level or a lower power level. When the new setting is the same as the original setting, that is, when KB is the same as M(KB), indicating no change in power setting, M(KB) is unchanged and control proceeds accordingly. When a change in power setting from a power level to an OFF setting is detected, KB is read into M(KB) replacing the previously entered setting. When KB is different from M(KB) and is not an OFF setting, further testing on KB is performed to distinguish between an increase in the power setting and a decrease in the power setting in order to initiate the appropriate transient operating mode.

The first step in implementing the transient Instant On, Fast-Heat and Fast-Cool modes is to set the associated Instant On Latch (IOL), Fast-Heat Latch (FHL) or Fast-Cool Latch (FCL). When KB represents a nonzero power setting, Test Means 60 initially checks M(KB) to determine if the new setting represents a change from OFF to a power setting. If so, the Instant On Latch (IOL) 62 is set and KB is read into M(KB). If the new setting represents a change to a higher power setting, Test Means 60 generates an output signal which is logically ANDed with the inverted output signal from Heater Energy Level One Latch (HEL1) 64 by AND gate 66. When HEL1 is reset, as will be described further on, this indicates that the heating element temperature is less than a predetermined Fast-Heat threshold temperature and the signal from Test Means 60 is gated through to set Fast-Heat Latch (FHL) 68. In the event the new power setting represents a decrease from the previous setting, Test Means 60 generates an output signal which is logically ANDed with the output signal from Heater Energy Latch (HEL2) 70 via AND gate 72 which is operative to set Fast-Cool Latch (FCL) 74 when HEL2 70 is in its set state. HEL2 70 is in its set state, as will be further described hereinafter, when the temperature of heating element 12 is greater than the predetermined Fast-Cool threshold temperature. Thus, Fast-Cool Latch 74 is set when Test Means 60 detects a decrease in power level and the temperature of the heating element is greater than a predetermined Fast-Cool threshold temperature. The Fast-Heat, Fast-Cool, and Instant On Latches 68, 74 and 62, respectively, when set, enable Fast-Heat Timer (FHT) 78, Fast-Cool Timer 76 and Instant On Timer (IOT) 80, respectively. Each of these timers controls the duration of the corresponding operating modes by generating a reset signal to its associated latch upon the timing out of the predetermined time period for the operating mode.

Test Means 60 may be arranged to perform additional tests on the new power setting in determining when to generate signals to initiate the transient Fast-Heat and Fast-Cool modes, in order to avoid overshooting the desired new operating temperature. In order to avoid overshooting the desired temperature, the Test Means 60 may be arranged not to implement the Fast-Heat mode even though the new setting is greater than the old setting if the new power setting is less than a predetermined relatively low power setting. For newly selected power settings below this setting, implementation of the First-Heat mode would tend to overshoot the desired temperature. In the illustrative embodiment, the Fast-Heat mode is not implemented for new power settings less than five. Thus, for setting changes from one relatively low setting to a higher but still relatively low setting, the Fast-Heat mode is not initiated. This is implemented functionally by Test Means 60 by comparing KB to the reference level and only initiating the Fast-Heat initiating signal when the selected level is greater than the reference level. Similarly, Test Means 60 may be arranged to initiate the Fast-Cool mode only when the newly selected power setting is less than a predetermined relatively high power setting. Such an arrangement avoids the possibility of temporarily operating the heating element at a temperature lower than the desired operating temperature which could occur if the Fast-Cool mode were implemented in response to changes from one relatively high level to a lower but still relatively high level. In the illustrative embodiment, the newly selected level must be less than setting 11. This is implemented functionally by Test Means 60 by comparing the newly selected setting KB to setting 11. The Fast-Cool initiating signal is only generated when the new setting is less than the reference setting.

Duty cycle control of the heating element is carried out by Comparing Means 82 which compares the count of Master Counter 56 with a digital power signal representing the power setting to be implemented, to determine whether to energize the heating element during the next control interval. This digital power signal digitally represents the number of ON control intervals per control period for the power level selected. The number of ON control intervals per control period represented by the digital power signal for each power setting is shown in Col. 3 of TABLE I. It will be recalled that Master Counter 56 is incremented once each control interval repetitively counting from zero to 127. Comparing Means 82 generates an output signal to set the Power On Latch 84 when the count of Master Counter 56 is less than the digital power signal. Thus, for example, when the heating element is operated at power level 6 the element is to be energized for 18 control intervals during each control period. For power level 6, the power signal is a digital representation of the number 18. During each control period, the count of Master Counter 56 will be less than the power signal for counts zero through 17 corresponding to 18 counts and greater than or equal to the power level signal for the remaining 110 counts of the control period. Thus, the Power On Latch will be set for the first 18 control intervals of each control period.

During steady state operation, the digital power signal represents the actual power level selected, M(KB). However, when one of the transient operating modes is being implemented, Comparing Means 56 substitutes a value for the digital power signal other than that corresponding to the actual power level selection signal. When the Instant On Latch is set, calling for the Instant On operating mode, a digital power signal value of 128 corresponding to the maximum power level setting is substituted for the value representing the actual power level setting. When the Fast-Cool Latch is set, calling for the Fast-Cool operating mode, Comparing Means 56 substitutes a value for the digital power signal corresponding to a power level six levels below the power setting actually selected, or the OFF setting, if the newly selected setting is within six levels of the OFF setting. For example, if the newly selected power setting is power level 8, the actual power level setting signal would be the digital representation of the number 33. However, during operation in the fast-cool mode, the power signal represents power level 2, i.e., the digital representation of 4. Similarly, when Fast-Heat Latch 74 is set, Comparing Means 82 substitutes a power signal corresponding to the power setting which is 6 levels higher than the actual selected power setting, or the maximum setting, if the actual power setting is within 6 levels of the maximum power setting. For example, if the newly selected power level setting is power level 8, the power signal corresponding to power level 14 representing the number 112 would be substituted for the power signal representing the actually selected power setting.

As mentioned briefly hereinbefore, Heater Energy Counter 46 is provided to indirectly monitor the approximate temperature of the heating element. Counter control means 48 responds to power signal employed by Comparing Means 82 by incrementing Heater Energy Counter 46 at a rate determined by that power signal. Counter control means 48 is operative to discontinue incrementing Heater Energy Counter 46 upon reaching a predetermined maximum count determined by the power setting at which the element is being energized and operated. Counter comparing means 86 is operative to compare the count of Heater Energy Counter 46 to three different predetermined threshold counts corresponding to threshold temperatures. The first threshold count represents the hot light threshold temperature above which the heating element is uncomfortably hot to the touch. Upon determining that the count of Heater Energy Counter 46 is greater than this first predetermined count, Counter Compare Means 86 generates a signal which sets the Heater Energy Latch, HEL0 88. Setting of latch 88 actuates indicator means 50 which provides a signal detectable by the operator that heating element 12 exceeds the first referenced temperature and is thus too hot to touch. The second threshold count represents the Fast-Heat threshold temperature. It will be recalled that it is desirable not to initiate the Fast-Heat operating mode when the temperature of the heating element is above this temperature, so as to avoid overshooting the operating temperature for the newly selected higher power setting. Upon detecting that the count of Heater Energy Counter 46 exceeds the second count, Counter Compare Means 86 sets HEL1 64. When HEL1 is set, AND gate 66 blocks the Fast-Heat set signal from Test Means 60 to Fast-Heat Latch 68 preventin initiation of the Fast-Heat mode. When HEL1 is in its reset state, gate 66 is enabled and the signal from Test Means 60 is gated to Fast-Heat Latch 64, initiating operation in the Fast-Heat operating mode upon detection of a change from one setting to a higher power setting.

The third threshold count represents the Fast-Cool threshold temperature. It will be recalled that it is desirable not to initiate the Fast-Cool operating mode when the temperature of the heating element is less than this temperature, so as to avoid overshooting the temperature for the newly selected lower power setting. Counter Compare Means 86, upon determining that the count of Counter 46 exceeds this third predetermined count, sets HEL2 70. When HEL2 is set, AND gate 72 gates the Fast-Cool signal from Test Means 60 to Fast-Cool Latch 74, enabling initiation of the Fast-Cool mode, when a decrease in power setting has been detected. Thus, the Fast-Cool Latch can only be set when the count of Heater Energy Counter 46 is greater than the Fast-Cool threshold count.

To demonstrate system operation by example, it will be assumed that the last power setting entered was OFF and the newly selected power setting is power level 6.

To illustrate the Instant On operating mode, when the operator sets rotary knob 22 (FIGS. 1 and 3) at position 6, the signal is stored as KB in memory at the beginning of the next control interval. Test Means 60 checks KB for an OFF setting. Test Means 60 next checks to determine if the previous setting was an OFF setting. Upon determining that the new signal is one of power setting 1-15 and that the previous setting was an OFF setting, Test Means 60 proceeds to set the Instant On Latch 62. Compare Means 82 responds by implementing power setting 15. Comparing means 82 continues to operate in this fashion for a predetermined period on the order of 4.8 seconds until Instant On Timer 76 times out, resetting Instant On Latch 62, and initiating steady state operation. Thereafter, comparing means implements power setting 6, providing a duty cycle of 16% by energizing heating element 12 for the first 18 control intervals of each control period. During operation in the Instant On Mode, Heater Energy Counter 46 is incremented at a rate of 2 counts per energized control interval (TABLE 1). At power level 15, the heating element is energized every control interval for total counter increment rate of 256 counts per control period. For an Instant On mode of roughly 4 seconds duration, corresponding to approximately ¼ of a control period, the counter is incremented approximately 64 counts while operating in the Instant On mode. Upon reverting to operation at the selected power level, Heater Energy Counter 46 is incremented at a rate of 4 counts per energized control interval. At power level 6, the heating element is energized for 18 control intervals per control period. Thus, the Heater Energy Counter is incremented at a rate of 72 counts per control period. Counter Compare Means 86 is arranged to set Heater Energy Latch 88 at a count of 256 representing a hot light threshold temperature of 170° F. In the example, the count would reach 256 after approximately 55 seconds has elapsed. Thus, after 55 seconds of operation, Heater Energy Latch will be set, thereby causing indicator hot light 32 to be energized.

To illustrate the Fast-Heat operating mode referring again to the foregoing example, it will be assumed that after approximately 10 minutes of operation at power level 6, the user elects to change the power setting to 11. During the first control interval following this change by the user, the new power level setting is read into memory 58 as KB. Test Means 60 compares KB to the previously stored setting. Upon determining that the new setting is higher than the previous setting, Test Means 60 generates a signal which is logically ANDed with the reset output of heater energy latch 64. After 10 minutes, the count of Heater Energy Counter 46 is slightly less than 3K. Counter Compare Means 86 sets latch HEL1 when the count of Heater Energy Counter 46 reaches 4096. Consequently, the Heater Energy Latch HEL1 is in its reset mode and the set signal from Test Means 60 is gated through to set Fast-Heat Latch 68 via AND gate 66. In response to the set state of Fast-Heat Latch 68, Comparing Means 82 substitutes a value for the power signal corresponding to a power level 6 levels higher than the selected power setting, or the maximum setting if the selected setting is within 6 levels of the maximum setting. In this example, the selected power setting is 11, so the comparing means substitutes a power signal representing the maximum power level 15, causing the heating element to be energized at 100% duty cycle for the duration of the fast-heat mode of operation. The Fast-Heat Timer 76 is set to time out after approximately 8.5 seconds, at which time Fast-Heat Latch 74 is reset and Comparing Means 82 then energizes the heating element at the duty cycle of 50% corresponding to power level 11. Heater Energy Counter 46 continues t be incremented during each energized control interval until reaching the maximum count for power level 11 of 8192. The increment rate for level 11 is two counts per energized control intervals. There are 64 energized control intervals per control period so the count is incremented a total rate of 128 counts per control period until reaching a count of 8192, at which time Counter Control Means 48 discontinues incrementing Heater Energy Counter 46. The count remains at that level until the heating element is deenergized by selection of the OFF setting by the operator. On selection of the OFF setting, Test Means 60 determines that the OFF setting has been selected, the new setting is then shifted from KB to M(KB), Comparing Means 42 implements the zero duty cycle corresponding to the OFF power setting, and Counter Control Means 48 in response thereto begins to decrement Heater Energy Counter 46 at a rate of ½ count per control interval for a total rate of 64 counts per control period. The Heater Energy Latches HEL2, HEL1 and HEL0 are reset as the Heater Energy Counter is decremented down. Heater Energy Latch HEL0 remains set until the count decrements down below the count of 256, thereby signifying to the operator that the heating element remains too hot to touch even though the element is no longer being energized. The rate of decrementing the Heater Energy Counter 46 approximates the rate of cooling of the heating element. Thus, the heater energy light remains energized until the temperature of the heating element has lowered to a safe level. It will require approximately 35 minutes for the count of Heater Energy Counter 46 to decrement down from the count of 8192 to the level at which the Heater Energy Latch HEL0 which controls energization of the hot light is reset, thereby deenergizing the hot light.

If, in the foregoing example, the user had operated the heating element at power level 6 for 20 minutes before selecting power level 11, Heater Energy Latch HEL1 would have been set at the time the power level change was made, indicating that the heating element was already above the Fast-Heat threshold temperature. In this case, the signal from the Test Means 60 to Fast-Heat Latch 68 would have been blocked by AND gate 66. With latch 68 in its reset state, Comparing Means 82 would have implemented the actual new power level selected, rather than the power level associated with the transient fast-heat mode.

In order to illustrate operation in the Fast-Cool mode, assume that, in the foregoing example, after the heating element had been operating for 20 minutes at power level 11, the user selected a low power setting such as power level 7. At the beginning of the control interval immediately following the change in settings, this new setting would be entered in memory 58 at KB. Test Means 60 would compare KB to M(KB) and determine that the new power setting was lower than the previous power setting and generate a set signal for Fast-Cool Latch 74. During operation at power setting 11 Heater Energy Counter 46 would have been incremented above the Fast-Cool threshold count of 6144 associated with the predetermined Fast-Cool threshold temperature, causing Counter Compare Means 48 to set Heat Energy Latch 70, HEL2. Thus, a set signal from Test Means 60 would be gated through to set Fast-Cool Latch 74 via AND gate 72. Setting the Fast-Cool Latch 74 enables Fast-Cool Timer 76 which controls the duration of the operation of the Fast-Cool mode, and causes Comparing Means 82 to implement the Fast-Cool mode by operating the heater element at a power level six levels below the actual power level selected by the operator. Thus, for power level 7 the comparing means would implement power level 1 during operation in the Fast-Cool mode, calling for a duty cycle of 2% in which the heating element is energized for three control intervals per control period. Operation at this duty cycle would continue until the Fast-Cool logic timer times out (approximately 16.8 seconds), resetting the Fast-Cool Latch. Thereafter, the comparing means would operate the heating element at the duty cycle associated with power level 7, energizing the heating element for the first 26 control intervals of each control period.

D. Microprocessor Implementation

Figure 7:
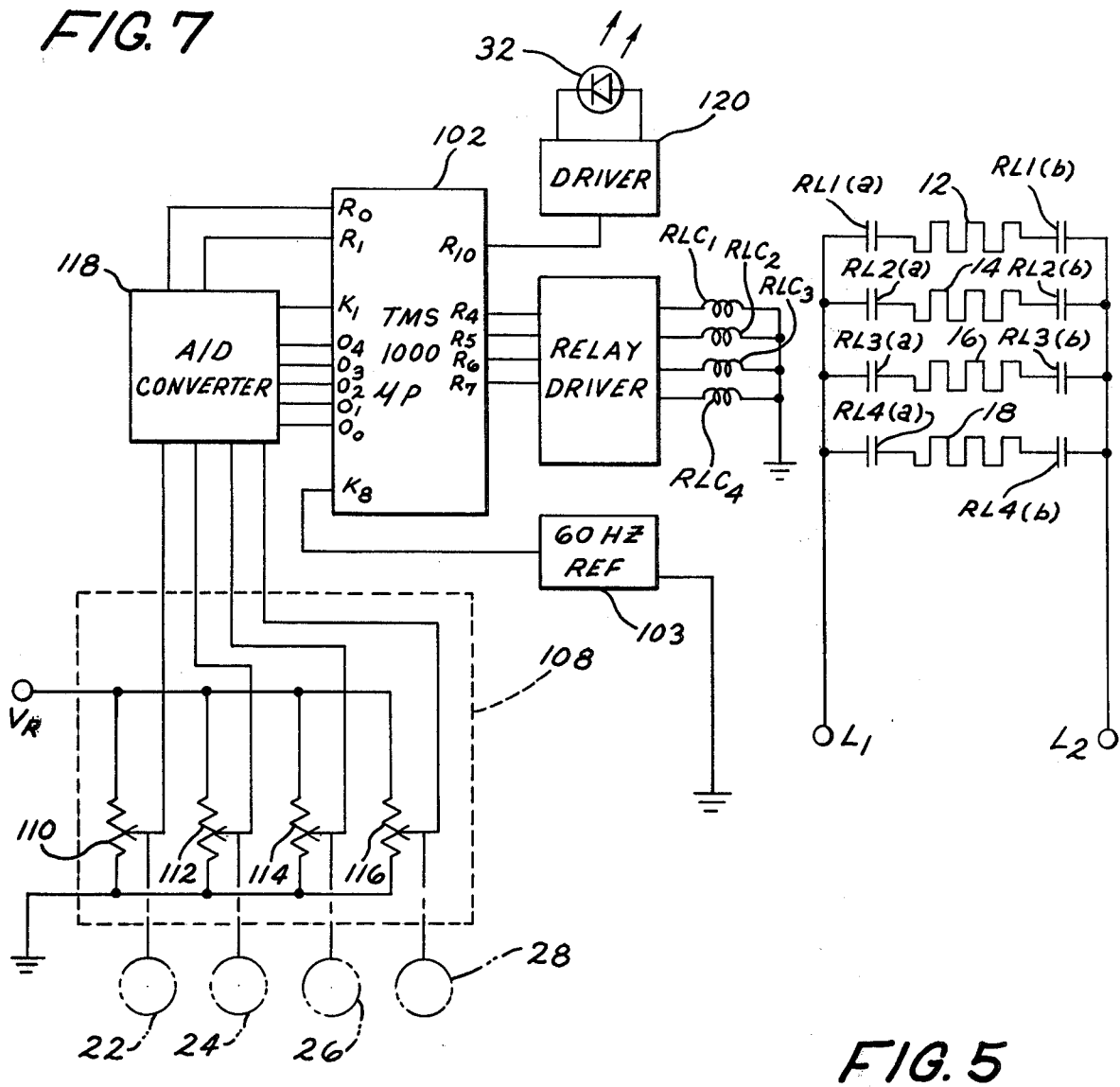
FIG. 7 is a simplified schematic diagram of a control circuit illustratively embodying the control arrangement of the present invention.

Referring now to FIG. 7, there is shown in simplified schematic form a microprocessor based control circuit which illustratively embodies the control arrangement of the present invention. Power to heating elements 12, 14, 16 and 18 is provided by application of a standard 60 Hz AC power signal of either 120 or 240 volts across terminals L1 and L2. Heating elements 12, 14, 16 and 18 are arranged in an electrical parallel fashion across lines L1 and L2 via an array of relays RL1, RL2, RL3 and RL4, each having two sets of contacts (a) and (b) connected between the heating element and lines L1 and L2, respectively, for elements 12, 14, 16 and 18, respectively.

Control signals for opening and closing relays RL1-RL4 are provided by microprocessor 102. A 60 Hz signal is generated by a conventional zero crossing detector 103 and applied to microprocessor input port K8 for purposes of synchronizing system operation with zero crossings of the power signal applied across terminals L1 and L2. Relay control signals from output ports R4-R7 are coupled to relay coils RLC1 through RLC4 of relays RL1-RL4, respectively, by relay driver network 104. These control signals are generated by microprocessor 102 in accordance with the power level selected by the user in a manner to be described hereinafter.

Means for enabling the operator to select the desired power level for each of the heating elements 12, 14, 16 and 18 is provided by power level selection means designated generally 108. Power level selection switch means 108 comprises a set of four potentiometers 110-116 connected in parallel, for controlling of heating element 12, 14, 16 and 18, respectively. A constant reference voltage is applied across the potentiometers 110-116. Wiper arms 110(a), 112(a), 114(a) and 116(a) for potentiometer 110-116, respectively, are positioned in accordance with the power settings selected by operator manipulation of the corresponding ones of control knobs 22-28. Conventional analog to digital converter means 118 scans the setting from each of potentiometers 110-116 to provide a digital input signal to microprocessor 102 representing the power level selected for each heating element. Scanning signals are output from microprocessor 102 at output ports $O_0$ through $O_4$. The power level signal is input to microprocessor 102 at input port K1. Signal light 32 comprises a conventional light-emitting diode (LED) which is coupled to output port $R_{10}$ of microprocessor 102 by a conventional LED driver circuit 120.

Microprocessor 102 of the circuit of FIG. 7 is a TMS 1000 series microprocessor. Technical details concerning the general characteristics of microprocessor 102 are available in a Texas Instruments, Inc. publication entitled, "TMS 1000 Series Data Manual," published in December, 1975.

D.1 CONTROL PROGRAM

Microprocessor 102 is customized to perform the control functions of this invention by permanently configuring the ROM of the microprocessor to implement predetermined control instructions. FIGS. 8-20 are flow diagrams which illustrate the control routines incorporated in the control program of microprocessor 102 to perform the control functions in accordance with the present invention. From these diagrams, one of ordinary skill in the programming art can prepare a set of instructions for permanent storage in the ROM of microprocessor 102. For the sake of simplicity and brevity, the control routines to follow will be described with respect to the control of heating element 12. It should be understood that for the control system of FIG. 1 the routines are executed once for each of heating elements 12-18 during each control interval. It should be further understood that in addition to the control functions of the present control arrangement there may be other control functions to be performed in conjunction with other operating characteristics of the appliance. Instructions for carrying out the routines described in the diagrams may be interleaved with instructions and routines for other control functions which are not part of the present invention.

The control program consists of a sequence of routines illustrated in the flow diagrams. The control program is cycled through once each control interval for each heating element. It should be noted that the control circuit is continually energized while the apparatus is plugged in regardless of the power setting selected. A description of each routine with reference to the flow diagram follows.

Figure 8:
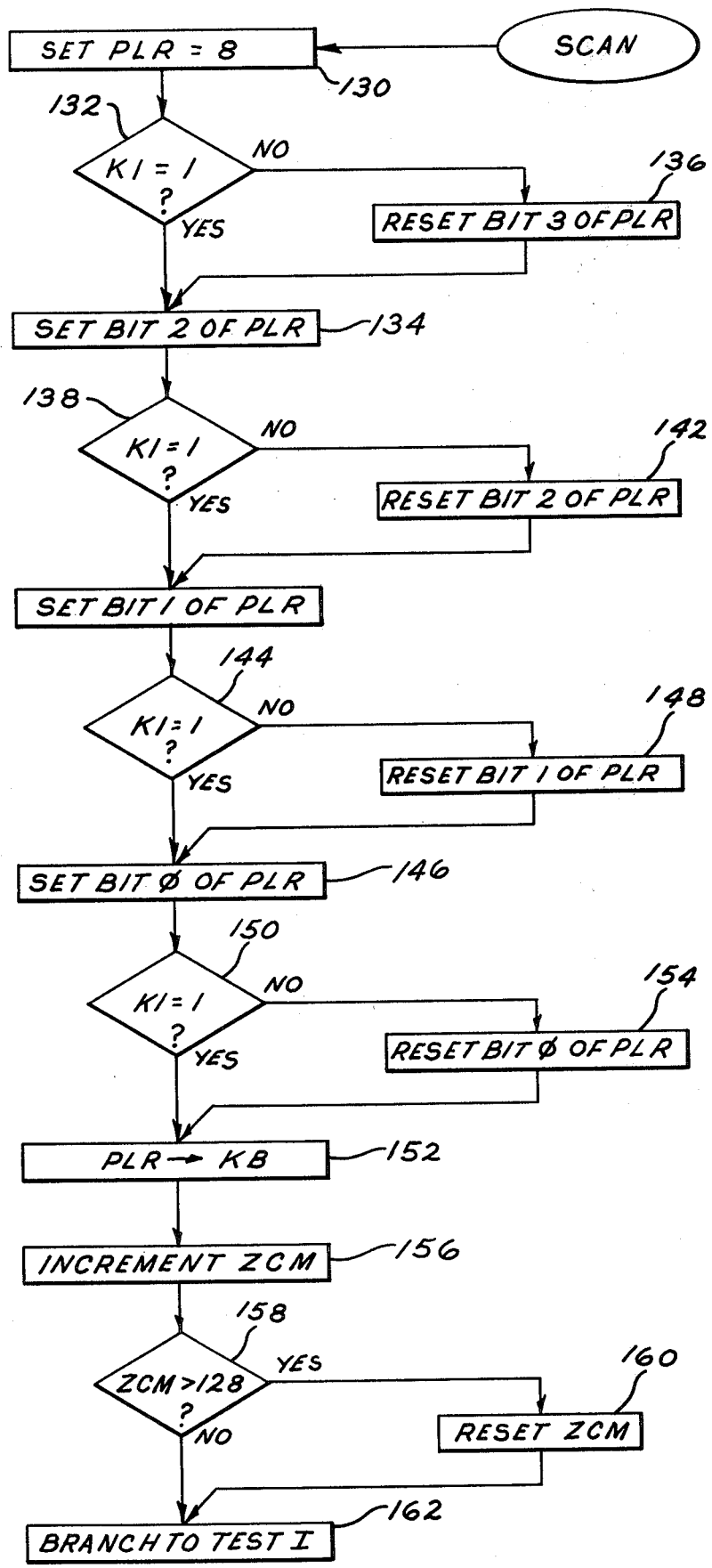
FIG. 8 is a flow diagram of the SCAN routine incorporated in the control program for the microprocessor in the circuit of FIG. 7.

(a) SCAN ROUTINE—FIG. 8

The function of this routine is to scan the operator controlled input potentiometers to determine the power setting selected for each of the heating elements. During execution of this routine for a particular heating element, the potentiometer associated with that heating element is scanned.

It will be recalled that there are 16 possible power settings represented by digital signals corresponding to the number of the settings from 0-15. In this routine, PLR is a 4-bit digital word which sets the reference voltage in the A/D conversion scheme via a resistive ladder network portion of A/D converter 118. PLR is varied in accordance with a successive approximation technique and the voltage generated in the A/D converter is then compared to the voltage across the corresponding one of operator adjustable potentiometers 110-116 to determine the power level selected.

The search starts in the middle with PLR equal to eight (PLR→1000) (Block 130). Inquiry 132 determines if the operator selected power setting is higher ($K1=1$) or lower ($K1=0$). If higher, PLR is set equal to 12 by setting Bit 2 (PLR→1010) (Block 134). If lower, PLR is set equal to 4 by resetting Bit 3 (Block 136) and setting Bit 2 (Block 134) (PLR→0010).

Inquiry 138 determines if the setting is higher or lower than the present PLR. If higher ($K1=1$) the PLR is increased by 2 by setting Bit 1 (Block 140). If lower ($K1=0$) PLR is decreased by 2 by resetting Bit 2 (Block 142) and setting Bit 1.

Inquiry 144 determines whether the present value of PLR is higher or lower than the reference. If higher, PLR is increased by 1 by setting Bit 0 (Block 146). If lower, PLR is decreased by 1 by resetting Bit 1 (Block 148).

Inquiry 150 repeats the higher or lower test on the selected value. If higher, PLR is read into KB (Block 152). If lower, PLR is reduced by 1, by resetting Bit 0 (Block 154) and then PLR is read into KB (Block 152).

The Master Counter (ZCM) is incremented (Block 156). The ZCM count is checked by inquiry 158. If greater than 128, ZCM is reset (Block 160). The program then branches (Block 162) to the Input Test Routine, FIG. 9.

Figure 9:
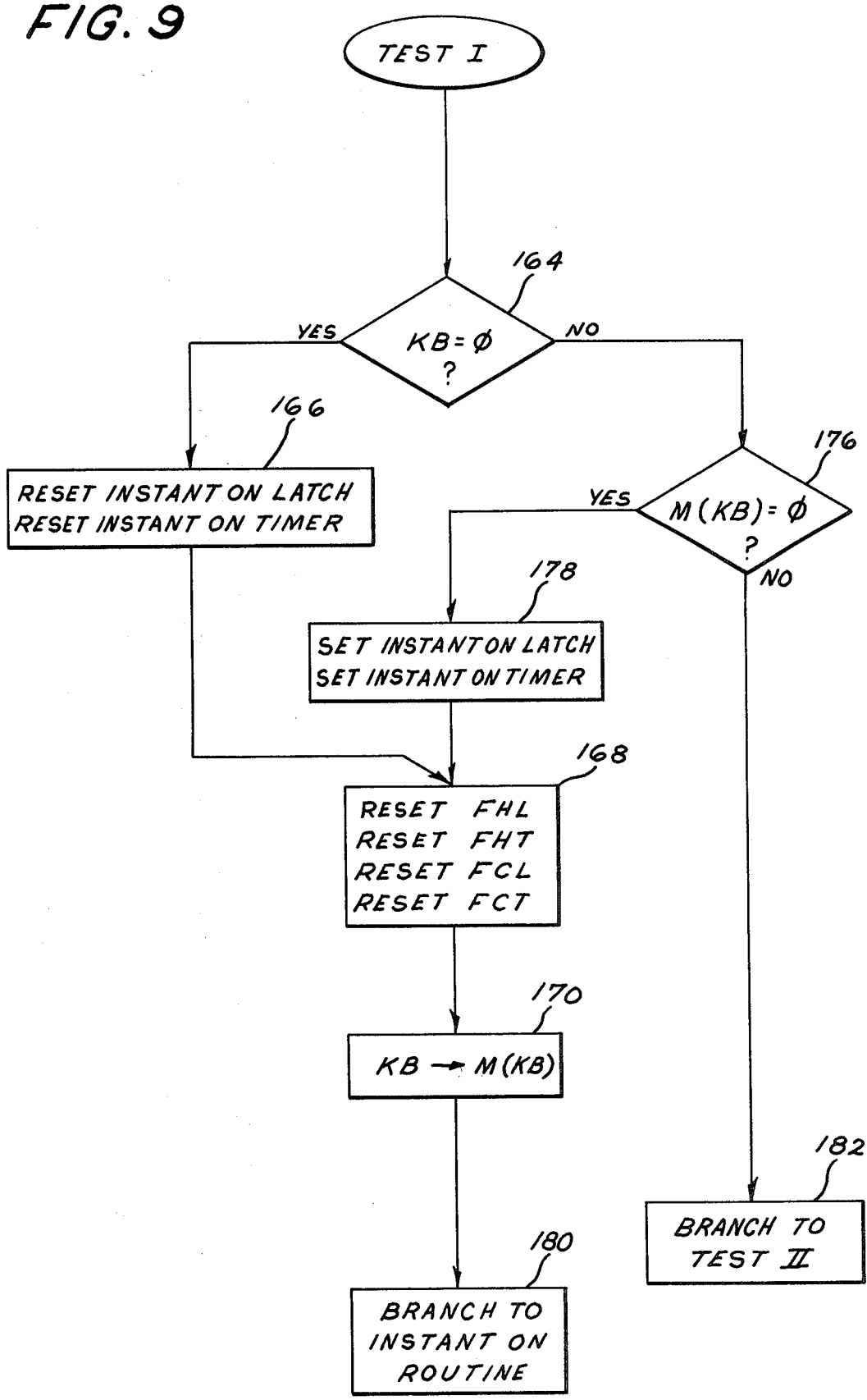
FIG. 9 is a flow diagram of the TEST I routine incorporated in the control program for the microprocessor in the circuit of FIG. 7.
Figure 10:
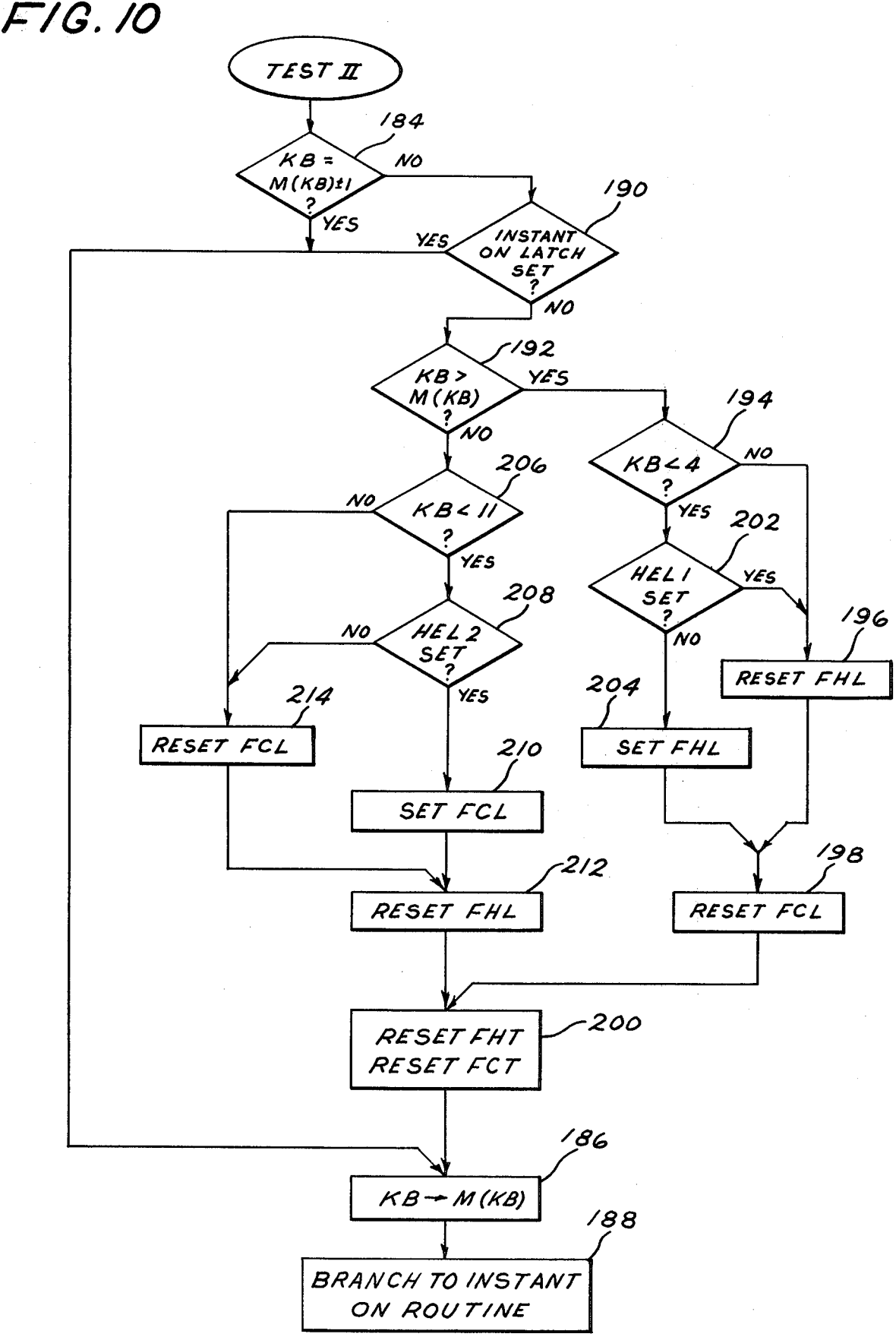
FIG. 10 is a flow diagram of the TEST II routine incorporated in the control program of the microprocessor in the circuit of FIG. 7.

(b) INPUT TEST ROUTINE—FIGS. 9 and 10

The routine essentially performs the function of Test Means 60 of FIG. 6, comparing KB with M(KB) to determine which, if any, of the transient modes should be initiated, and appropriately setting the Instant On, Fast-Heat or Fast-Cool Latches.

Inquiry 164 determines whether KB is an OFF selection or a power setting selection. If Off, the Instant On Latch and Instant On Timer are reset (Block 166) and the Fast-Heat Latch, Fast-Cool Latch and associated timers are all reset (Block 168). KB is transferred into permanent memory as M(KB) (Block 170). If KB is not an OFF setting, Inquiry 176 determines whether KB represents a change from an OFF setting to a power setting by checking the previous setting M(KB) for an OFF setting. If M(KB) is an OFF setting, the Instant On Latch is set, and the Instant On Timer is reset (Block 178). The Fast-Heat and Fast-Cool latches and timers are reset (Block 168) and KB is shifted into M(KB) (Block 170), and the program branches (Block 180) to the Instant On Routine, FIG. 11. If KB does not represent a change from OFF to a power setting, the program proceeds to the Test II Routine (FIG. 10) to perform further tests on KB (Block 182).

Inquiry 184 determines whether the new setting is within one power level of the old setting. If it is, the new setting is shifted into permanent memory (Block 186), and the program branches (Block 188) to the Instant On Routine, FIG. 11. This in effect treats changes of only one level as if no change occurred for purposes of implementing any of the transient modes since the change is not great enough to need the transient modes to speed the response of the heating unit.

If a new setting is more than one power level higher or lower than the previous setting, Inquiry 190 checks the state of the Instant On Latch. If it is set, signifying that the Instant On mode is in progress, no further testing is performed. KB is shifted into M(KB) (Block 186) and the program branches (Block 188) to the Instant On Routine, FIG. 11. If the Instant On Latch is not set, Inquiry 192 determines whether the new setting is greater than or less than the old setting.

If the new setting represents an increased power setting, Inquiry 194 determines if this increase in power setting is to a power setting greater than reference power level 4. If not, the Fast-Heat Latch, Fast-Cool Latch, and associated timers (Blocks 196, 198, and 200) are reset, the new setting KB is read into M(KB) (Block 186) and the program branches (Block 188) to the Instant On Routine, FIG. 11. This test for KB>4 is implemented because it is undesirable to implement the Fast-Heat Routine even though a power level increase has been selected if the new power setting is not higher than power level 4, since operation of the Fast-Heat mode for power settings lower than 5 could result in a temporary overshoot of the desired operating temperature. If the new power setting is 5 or higher, a check is made of HEL1 (Inquiry 202) to determine whether the heating element temperature is already above the predetermined Fast-Heat threshold temperature. If it is, the Fast-Heat Latch is reset (Block 196) and the program proceeds without implementing the Fast-Heat mode since the heating element is already above the threshold temperature. However, if HEL1 is not set, indicating that the heating element has not yet reached the fast-heat threshold temperature, the Fast-Heat Latch (FHL) is set (Block 204), the Fast-Cool Latch is reset (Block 198), the timers are reset (Block 200), the new setting is stored in memory (Block 186), and the program branches (Block 188) to the Instant On Routine, FIG. 11.

If Inquiry 192 determines that the new power setting is less than the old power setting, Inquiry 206 determines whether the new setting is less than reference power level 11. If yes, Latch HEL2 is checked by Inquiry 208 to determine if the heating element is operating above the threshold temperature for the Fast-Cool mode. If yes, the Fast-Cool Latch (FCL) is set (Block 210), FHL is reset (Block 212), the timers are reset (Block 200), the new power setting is transferred into permanent memory (Block 186), and the program branches (Block 188) to the Instant On Routine, FIG. 11. If the new setting is power level 11 or higher (No to Inquiry 206), the new setting represents a change either from power level 15 to power level 11, 12 or 13, or from power level 14 to power level 12 or 11, or from power level 13 to power level 11. Any of these changes are from a high power level to another relatively high power level and the Fast-Cool mode is unnecessary and may cause the operating temperature to temporarily drop below the desired new operating temperature. Also, even though the new power setting is less than power level 11, if HEL2 is not set (No to Inquiry 208) indicating that the current temperature of the heating element has not yet risen above the Fast-Cool threshold temperature, it is also undesirable to implement the Fast-Cool mode of operation. Thus, under any of these conditions, the Fast-Cool Latch is reset (Block 214), the Fast-Heat Latch is reset (Block 212), the new power level is read into the permanent memory M(KB) (Block 186), and the program branches (Block 188) to the Instant On Routine, FIG. 11.

Figure 11:
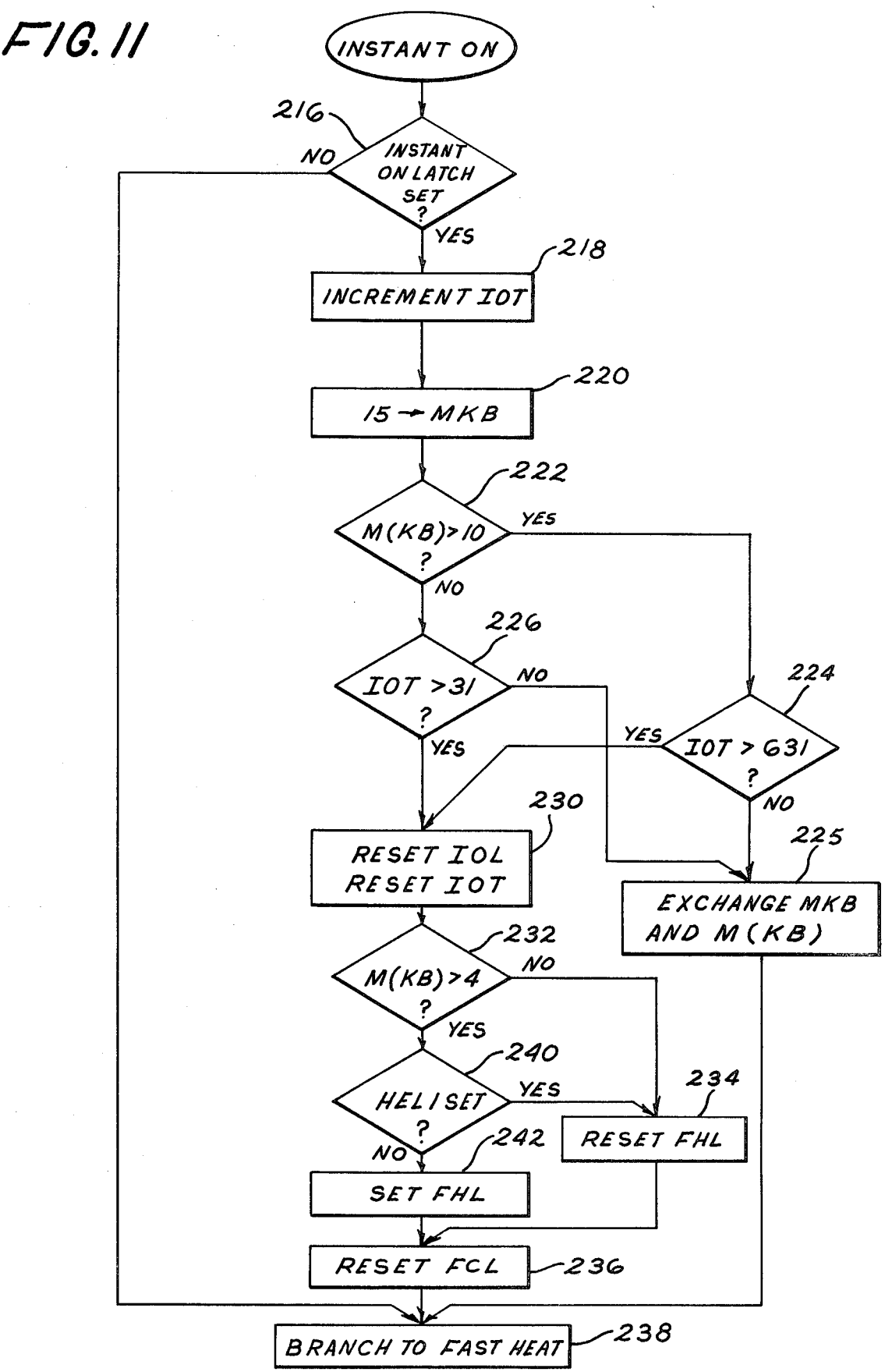
FIG. 11 is a flow diagram of the INSTANT ON routine incorporated in the control program of the microprocessor in the circuit of FIG. 7.

(c) INSTANT ON ROUTINE—FIG. 11

This routine performs one function of compare means 82 of FIG. 6 in implementing operation in the Instant On mode by substituting the signal representing the maximum power setting for the actual power setting when the Instant On Latch is set and also performs the timing function of Instant On Timer 80 of FIG. 4 to control the duration of operation in the Instant On mode.

Inquiry 216 determines whether or not the Instant On Latch has been set. If not, the program branches (Block 238) to the Fast-Heat Routine, FIG. 12. If it has been set, indicating that there has been a change from OFF to a power setting, the Instant On Timer is incremented (Block 218) and a signal representing power level 15 is stored in memory location MKB (Block 220). In implementing the Instant On mode, one single duration for this operating mode could be utilized. However, in the illustrative embodiment, the microprocessor is programmed to establish one duration for power settings greater than 10 and a shorter duration for power settings less than 10. The longer duration for the higher power settings enables them to get to the desired operating temperature more rapidly. A shorter duration for the lower power settings avoids overshoot which might occur as a result if the longer duration were used for all power settings. Inquiry 222 determines whether the new power setting is greater or less than 10. If greater than 10, Inquiry 224 controls the duration by resetting the Instant On Latch to end the Instant On operating mode when the count of the Instant On Timer (IOT) is greater than 63 corresponding to a time of approximately 8.4 seconds. If the power level is 10 or less, Inquiry 226 controls the duration of the Instant On operating mode by resetting when the Instant On Timer (IOT) count is greater than 31 corresponding to approximately 4.2 seconds. If the Instant On Timer has not timed out, the signal stored at MKB representing power level 15 is exchanged with that stored at M(KB) representing the actual power setting selected by the user, so that the M(KB) now represents the maximum power level setting (Block 228).

Once the Instant On Timer times out, the Instant On Latch (IOL) and timer IOT are reset (Block 230), Inquiry 232 determines if the power setting is greater than 4. If not, the Fast-Heat Latch is reset (Block 234) the Fast-Cool Latch is reset (Block 236), and the program branches (Block 238) to the Fast-Heat routine FIG. 12. If the selected power level is greater than 4, the state of HEL1 is checked (Inquiry 240) to determine whether the count of the Heater Energy Counter has indicated a heating element temperature greater than the Fast-Heat threshold temperature. If the HEL1 is set, indicating that the threshold temperature has been exceeded, the Fast-Heat Latch (FHL) is reset (Block 234), the Fast-Cool Latch is reset (Block 236) and the program branches (Block 238) to the Fast-Heat Routine, FIG. 12. If HEL1 is not set, indicating that the heating element has not yet reached the threshold temperature, the Fast-Heat Latch (FHL) is set (Block 242), the Fast-Cool Latch is reset (Block 236), and the program branches (Block 238) to the Fast-Heat Routine, FIG. 12.

Figure 12:
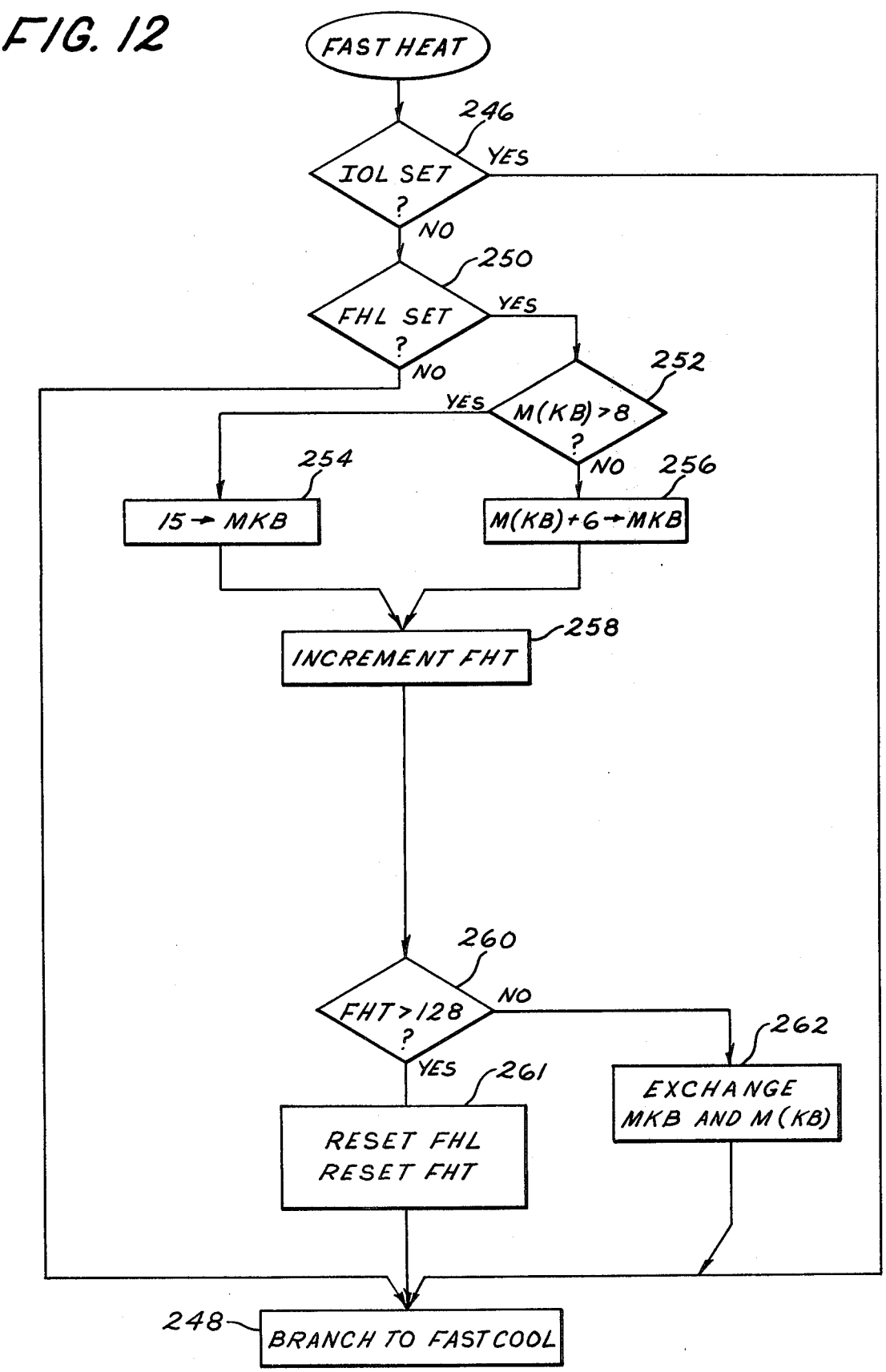
FIG. 12 is a flow diagram of the FAST-HEAT routine incorporated in the control program of the microprocessor in the circuit of FIG. 7.

(d) FAST-HEAT ROUTINE—FIG. 12

This routine performs another of the functions of comparing means 82 of FIG. 6 by implementing operation in the Fast-Heat mode. A signal representing a power level higher than the selected power level is substituted for the selected level signal for the duration of the Fast-Heat mode. This routine also performs the timing function of Fast-Heat Timer 76 of FIG. 4.

Inquiry 246 determines whether the Instant On Latch has been set. If yes, the program branches (Block 248) immediately to the Fast-Cool Routine FIG. 13. If no, Inquiry 250 determines if the Fast-Heat Latch has been set. If yes, Inquiry 252 determines if the power setting is level 9 or higher. If yes, power level 15 is substituted for MKB (Block 254), since the selected level is within 6 levels higher than the maximum level; if not, a signal representing 6 levels higher than the current power setting is stored at MKB (Block 256). Blocks 258 and Inquiry 260 function as a Fast-Heat Timer to terminate the Fast-Heat operating mode by resetting the Fast-Heat Latch (FHL) and timer FHT (Block 261) when the count of the fast-heat timer is greater than 128 corresponding to a total duration of approximately 17 seconds. If the fast-heat timer has not timed out (No at Inquiry 260), the signals stored at MKB and M(KB) are exchanged (Block 262) causing M(KB) to represent the Fast-Heat mode setting. The program branches (Block 248) to the Fast-Cool routine FIG. 13.

Figure 13:
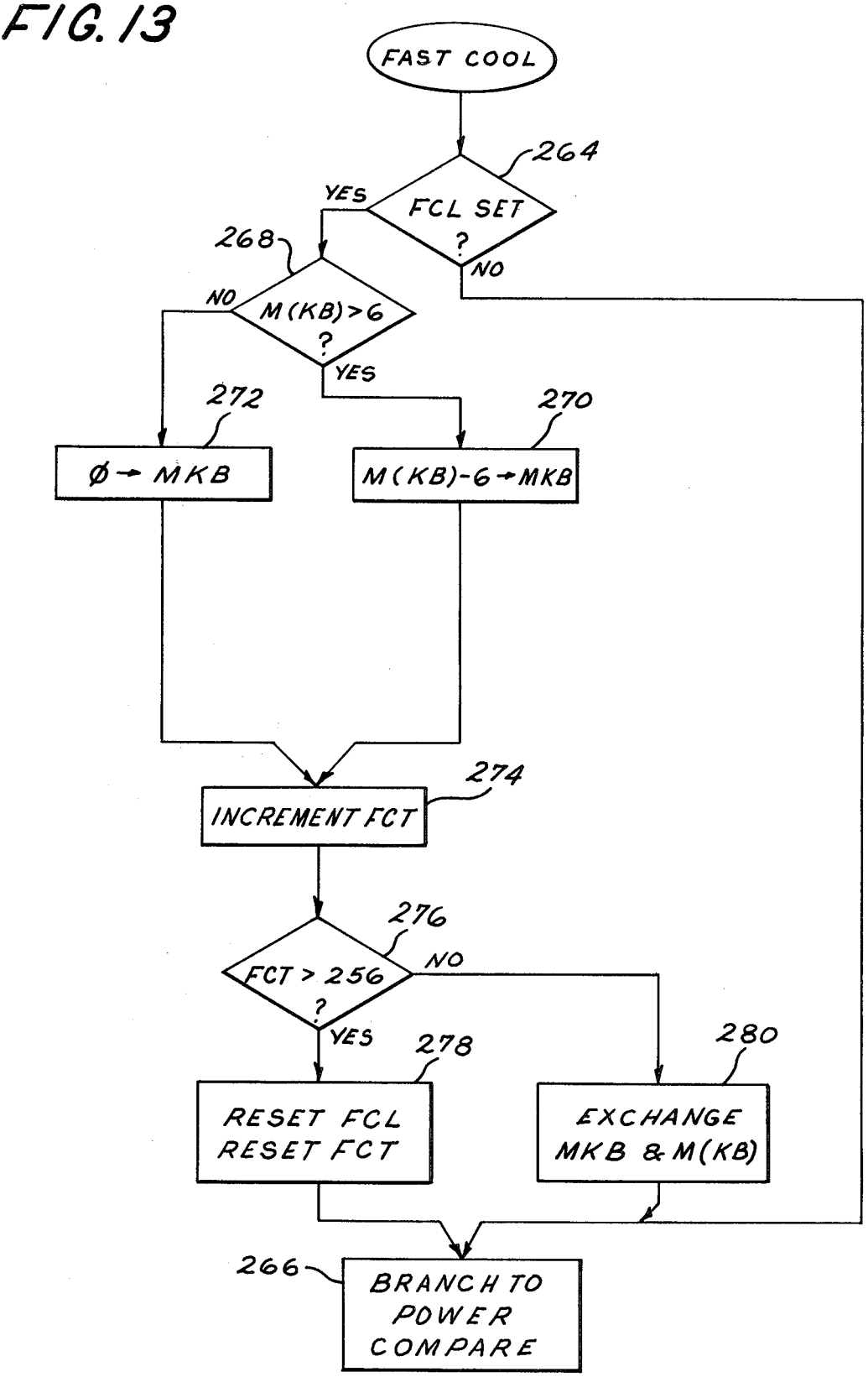
FIG. 13 is a flow diagram of the FAST-COOL routine incorporated in the control program of the microprocessor in the circuit of FIG. 7.

(e) FAST-COOL ROUTINE—FIG. 13

This routine performs another of the functions of comparing means 82 of FIG. 6, by implementing operation in the Fast-Cool mode when the Fast-Cool Latch is set. A signal representing a power setting lower than the actually selected setting is substituted for the signal representing the selected setting for the duration of the Fast-Cool mode. This routine also performs the timing function of Fast-Cool Timer 78 of FIG. 4.

Inquiry 264 checks the state of the Fast-Cool Latch (FCL). If not set, this indicates that the system is not operating in the Fast-Cool mode and the program branches to the Power Compare Routine (Block 266). If the Fast-Cool Latch is set, indicating operation in the Fast-Cool mode is desired, Inquiry 268 determines whether M(KB) is power level 6 or above. If yes, the power signal corresponding to the power setting six levels below the current power setting is stored at MKB (Block 270); if the power setting is less than 6, the power signal (0) corresponding to OFF is stored at MKB (Block 272). Block 274 and Inquiry 276 function as the Fast-Cool Timer (FCT), FCT is incremented (Block 274), then the count of the timer is compared to 256 Inquiry 276) corresponding to a time of 34 seconds. If timed out, the FCL and FCT are reset (Block 278), and the program branches (Block 266) to the Power Compare Routine, FIG. 14. If FCT is not timed out, the signal stored at MKB is exchanged with M(KB) (Block 280) to substitute the artifically low power setting for the actual power setting for operation in the Fast-Cool mode. Then the program branches (Block 266) to the Power Compare Routine, FIG. 14.

Figure 14:
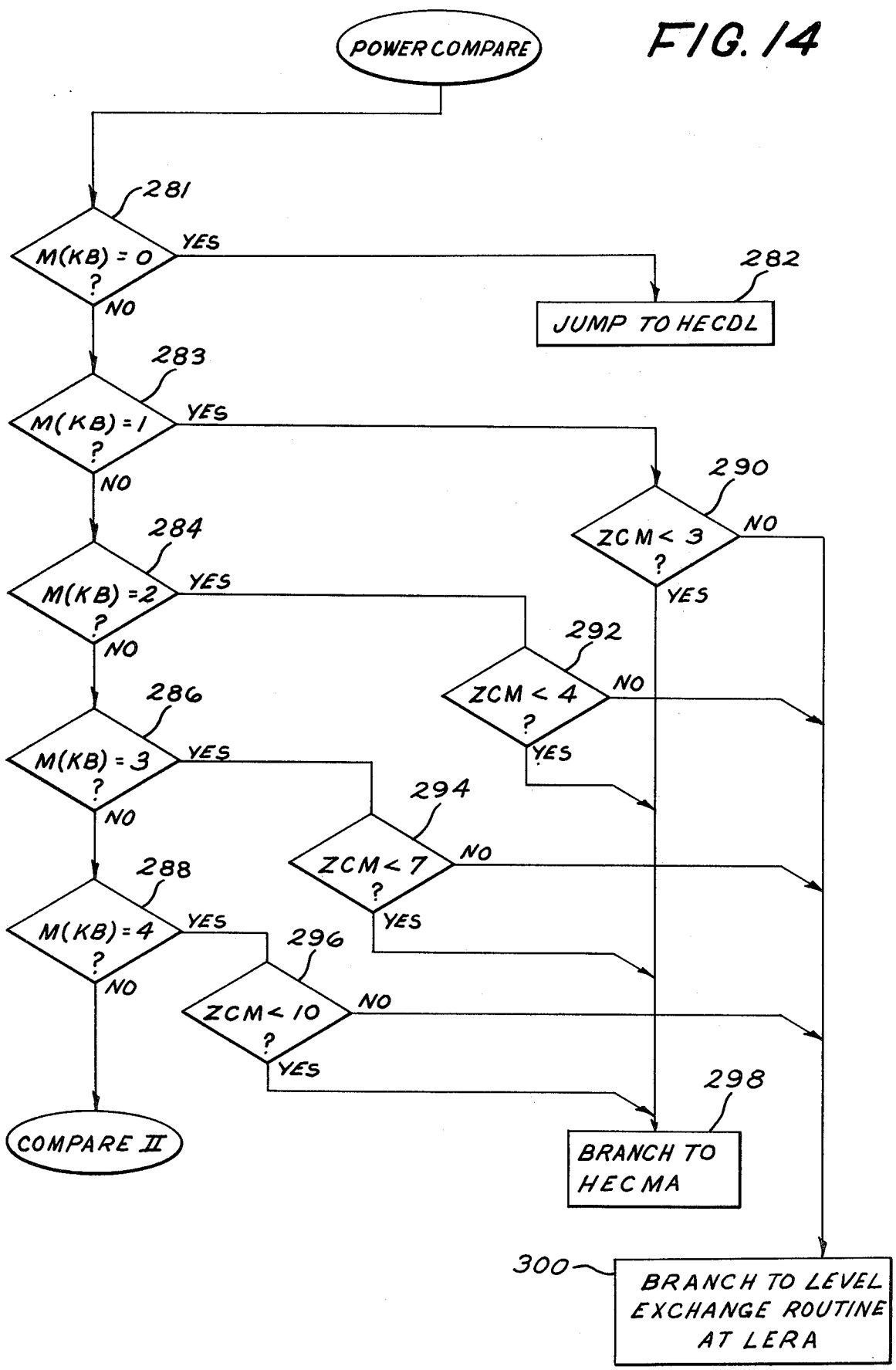
FIGS. 14-16 depict the flow diagram of the POWER COMPARE routine incorporated in the control program of the microprocessor in the circuit of FIG. 7.
Figure 15:
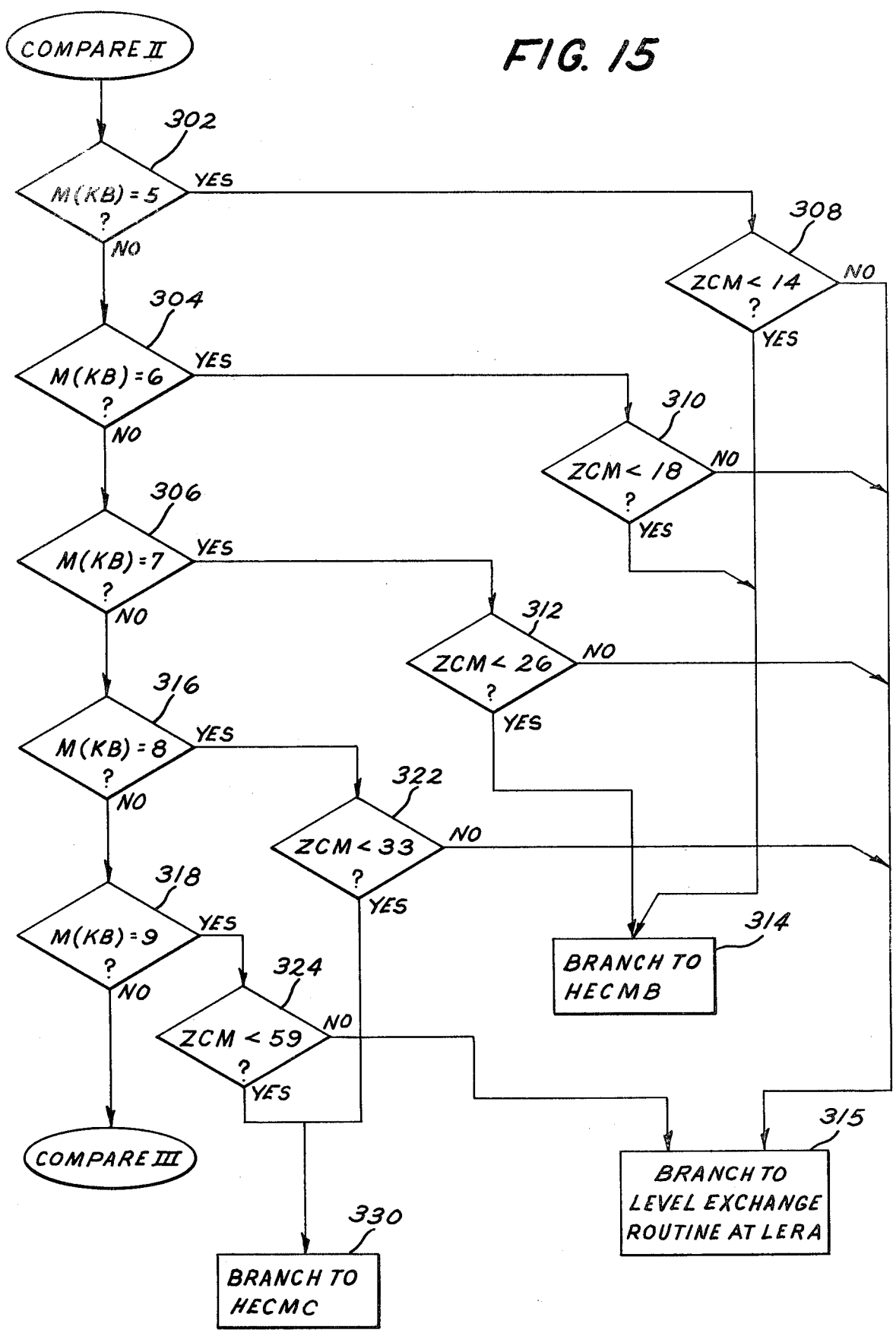
Figure 16:
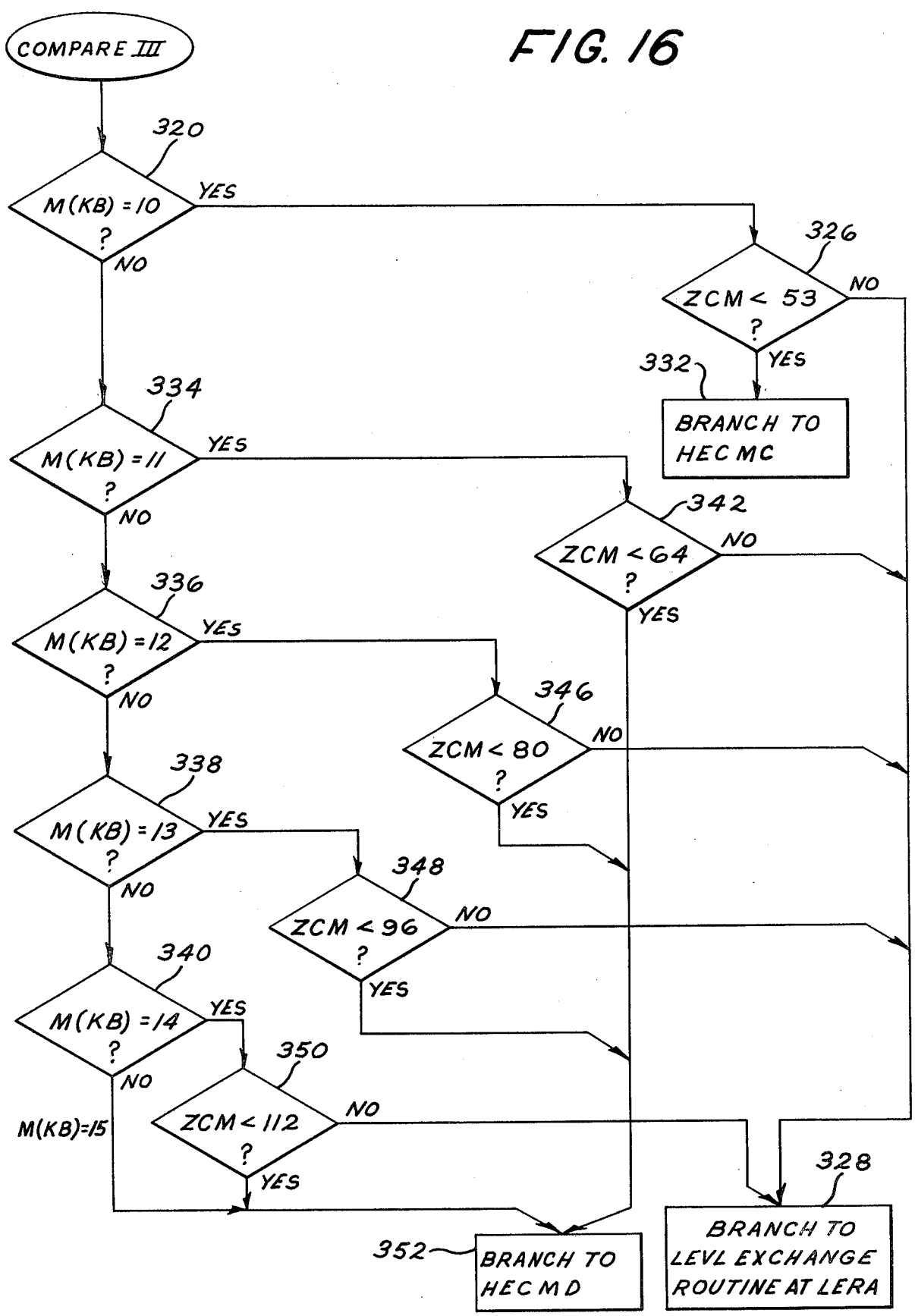

(f) POWER COMPARE ROUTINE—FIGS. 14–16

Figure 17:
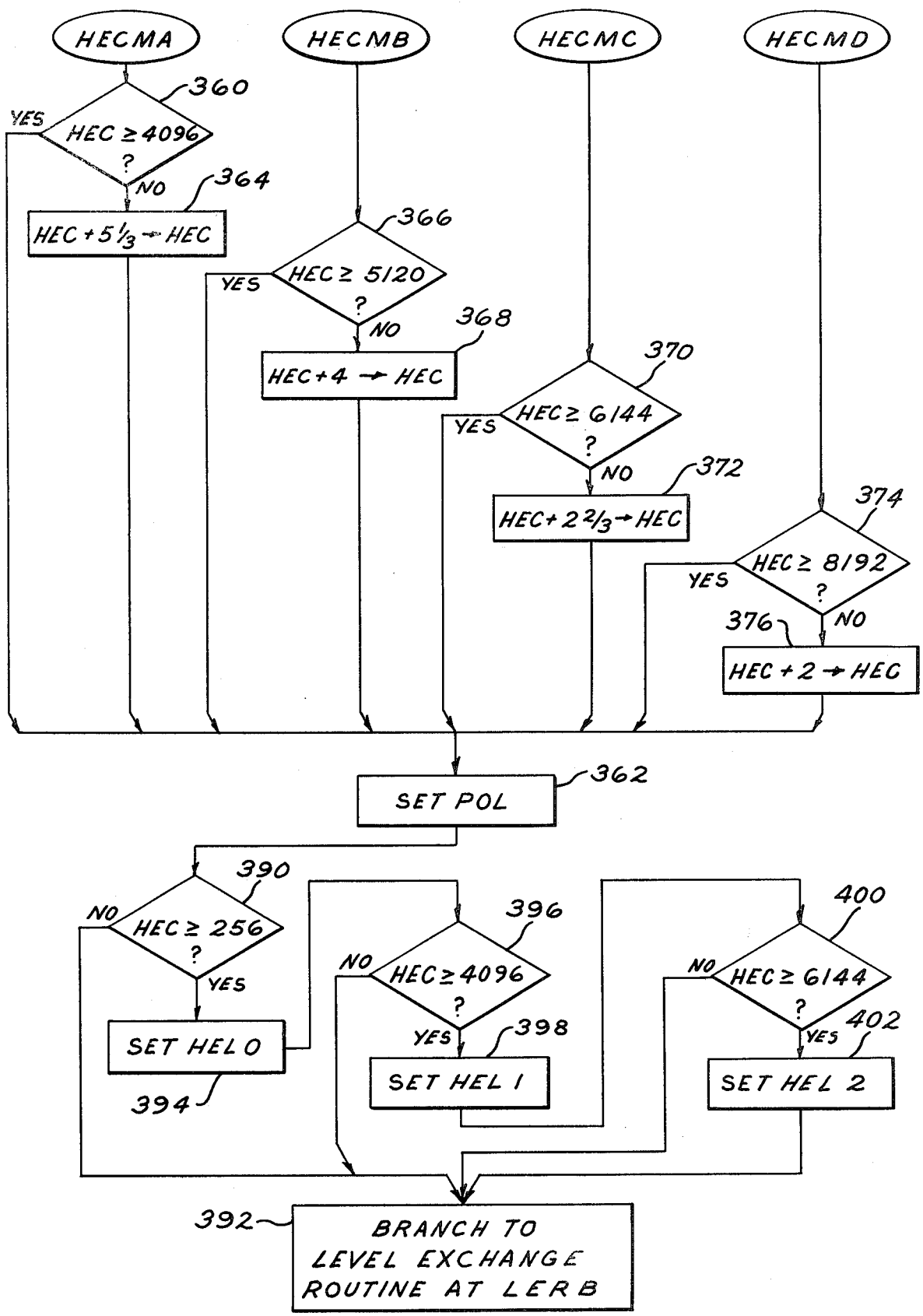
FIGS. 17-18 depict the flow diagram of the HEATER ENERGY COMPARE routine incorporated in the control program for the microprocessor in the circuit of FIG. 7.
Figure 18:
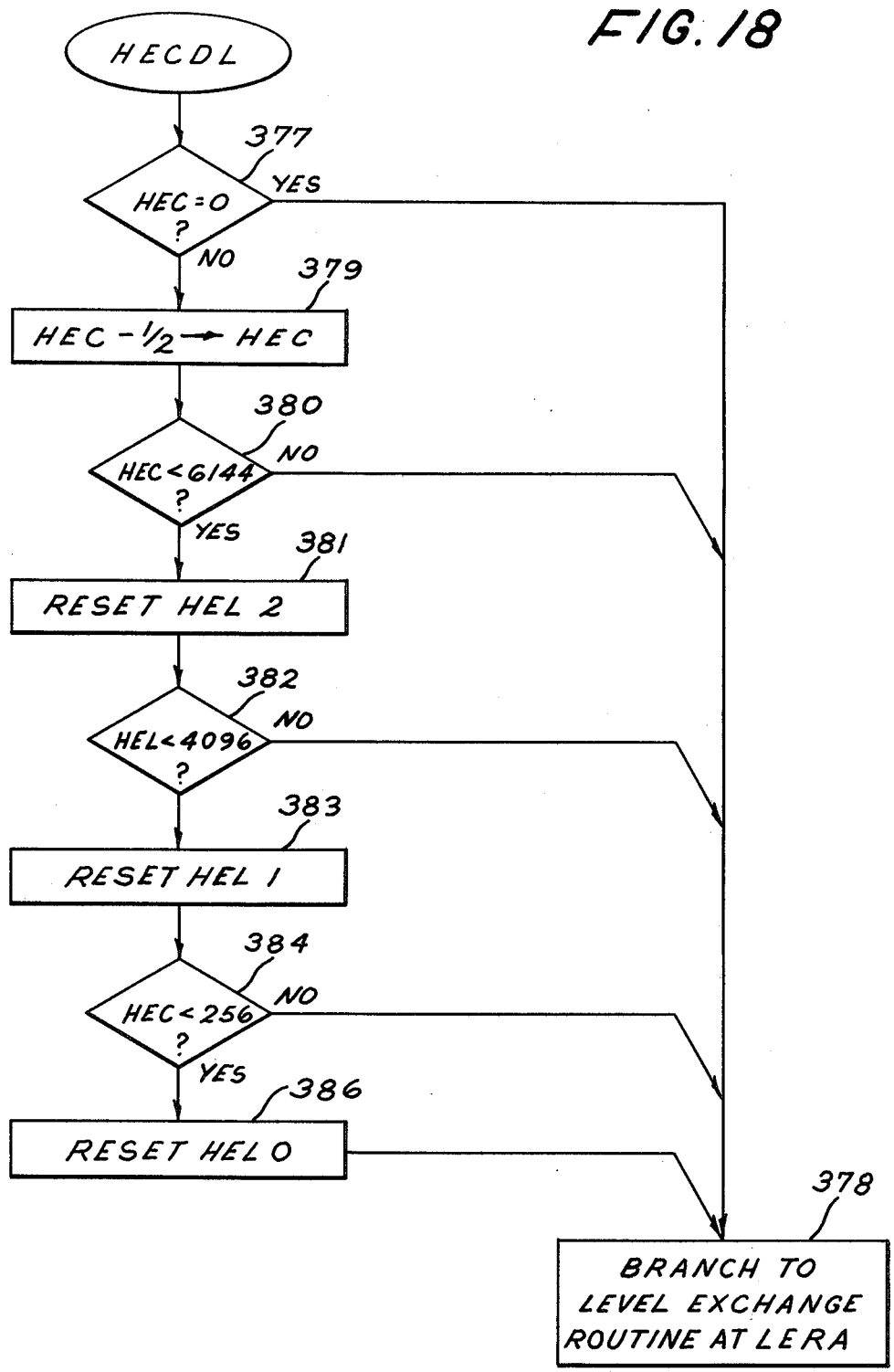
Figure 19:
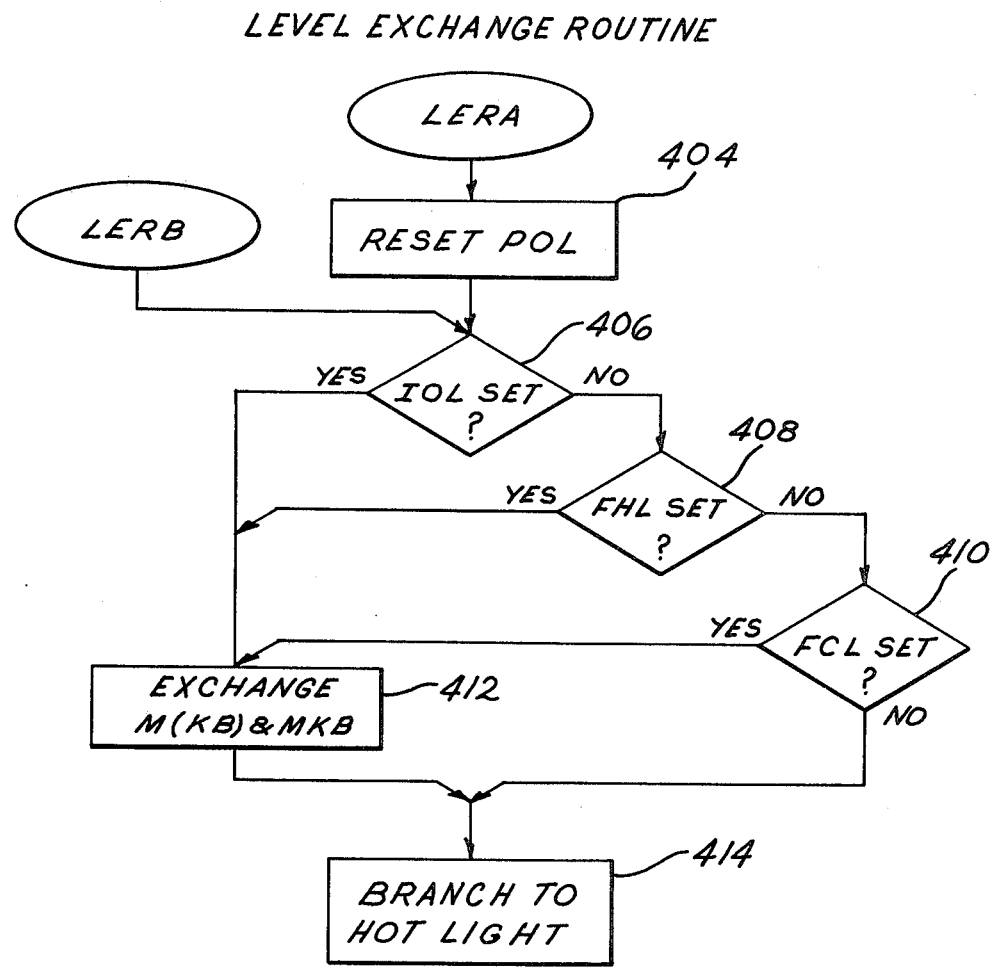
FIG. 19 is a flow diagram of the LEVEL-EXCHANGE routine incorporated in the control program for the microprocessor in the circuit of FIG. 7.

This routine performs the primary function of Compare Means 182 of FIG. 6, namely, to determine during each control interval whether or not the heating element is to be energized for the next control interval. This is done by comparing the count of the Master Counter (ZCM) to a number corresponding to the number of control intervals for which the heating element is energized per control period for the power setting selected, For M(KB)=0 representing the OFF power setting, Inquiry 281 and Block 282 directs the program to the Counter Decrementing Routine HECDL (FIG. 18). For M(KB) representing power level settings of 1–4, (Inquiries 283–288), the ZCM count is compared to reference counts 3, 4, 7 and 10, respectively (Inquiries 290–296). If the power level selected is one of levels 1–4 and the ZCM count is less than the reference corresponding to that power level, the heating element will be energized during the ensuing control interval and the program branches (Block 298) to the Heater Energy Counter Routine, entry point HECMA (FIG. 17), to appropriately increment the Energy Counter. If the ZCM count is not less than the corresponding reference value of the selected power level, the program branches (Block 300) to the Level-Exchange Routine (FIG. 19). If the selected power level is not one of levels 1–4, the program continues (FIG. 15). Inquiries 302, 304, and 306 determine whether the selected power level is level 5, 6, or 7, respectively. The corresponding reference values for these power levels are 14, 18 and 26, respectively. If the selected power level is one of 5, 6, or 7 and the ZCM count is less than the corresponding reference value as determined by Inquiries 308–312, respectively, the heating element will be energized during the ensuing control interval, and the program branches (Block 314) to the Heater Energy Compare Routine, entry point HECMB (FIG. 17) to increment the Heater Energy Counter. If one of these power levels is selected but the count is greater than the corresponding reference value, the heating element will not be energized during the ensuing control interval and the program branches (Block 315) to the Level-Exchange routine, FIG 19.

Inquiries 316, 318, (FIG. 4) and 320 (FIG. 15) determine whether power levels 8, 9 and 10 have been selected, respectively. The reference values associated with these power levels are 33, 42 and 53, respectively. If the ZCM count is less than the reference value corresponding to the selected power level, as determined by Inquiries 322, 324 (FIG. 14) and 326 (FIG. 15) the heating element will be energized during the ensuing control interval, and the program branches, Block 330 (FIG. 14) for Inquiries 323 and 324; Block 332 for Inquiry 326 (FIG. 15) to the Heater Energy Compare Routine at entry point HECMC (FIG. 17) to increment the Heater Energy Counter at the appropriate rate. If one of these levels is selected but the ZCM count is greater than the reference value, the program branches (Block 315) for Inquiries 322 and 324 (FIG. 15) and Block 328 for Inquiry 326 (FIG. 16) to the Level-Exchange routine, FIG. 19. Finally, Inquiries 334, 336, 338 and 340 determine whether power level 11, 12, 13, or 14 has been selected, respectively; corresponding reference values are 64, 80, 96, and 112, respectively. If the ZCM count is less than the corresponding reference value as determined by Inquiries 342–350 for one of the selected power levels, the heating element will be energized during the ensuing control interval, the program branches (Block 352) to the Heater Energy Compare Routine at entry point HECMD (FIG. 17) to increment the Heater Energy Counter. Additionally, if the answer to Inquiry 340 is no, the selection must represent power level 15, which is the maximum power level for which the heating element is energized during every control interval, and the program branches (Block 352) to Heater Energy Compare Routine at entry point HECMD (FIG. 17). If one of levels 11–14 is selected and the ZCM count is greater than or equal to the reference value, the program branches (Block 328) to the Level-Exchange routine (FIG. 19).

(g) HEATER ENERGY COMPARE ROUTINE—FIGS. 17 and 18

This routine performs the function of Counter Control Means 48 of FIGS. 2 and 6, by incrementing the Heater Energy Counter at the rate associated with the power level at which the heating element is operating; discontinuing the incrementing of the Heater Energy Counter when a maximum count for the power level is reached, and decrementing the Heater Energy Counter at a predetermined rate when the OFF power level is selected. When the heating element is to be energized during the next control interval as determined by the Power Compare Routine hereinbefore described, this routine is entered at one of points HECMA-HECMD, depending upon the power level at which the heating element is operating. When entered at one of these points, the Heater Energy Counter is incremented the appropriate number of counts and the Power Out Latch POL is set. When the POL is set a signal will be generated at R4 at the beginning of the next control interval for element 12 to hold contacts RL1(a) and RL1(b) closed for the duration of that control interval. This routine is only entered at one of points HECMA-HECMD, and thus the Heater Energy Counter is only incremented when the Power Compare Routine determines that the heating element is to be energized during the next control interval.

If one of power levels 1-4 has been selected, this routine is entered at entry point HECMA. Inquiry 360 determines whether the Heater Energy Counter has reached the maximum count for these four settings of 4096. If the count is less than the maximum count for these power settings, the Heater Energy Counter is incremented 5⅓ counts (Block 364), and the Power On Latch is set (Block 362). This increments the HEC at rates of 16, 21⅓, 37⅓, and 53⅓ counts per control period for settings 1-4, respectively. Setting of POL (Block 362) will close the heater control relay for the next control interval. If the maximum count has been reached, Block 364 is bypassed, leaving the HEC count unchanged, and POL is set (Block 362).

If the heating element is being operated at one of levels 5-7, this routine is entered at HECMB. Inquiry 366 determines if the maximum count of 5120 for these levels has been reached. If not, the Heater Energy Counter (HEC) is incremented by 4 counts (Block 368), and the POL is set (Block 362). This increments the HEC at the rate of 56, 72, and 104 counts per control period for settings 5, 6 and 7, respectively. If the maximum count has been reached, Block 368 is bypassed, leaving the count of the HEC unchanged, and the POL is set (Block 362).

If the heating element is operating at one of levels 8-10, this routine will be entered at point HECMC. Inquiry 370 determines if the maximum count of 6144 has been reached. If not, the HEC is incremented by 2⅔ counts (Block 372), and the POL is set (Block 362). This increments the HEC at an effective rate of 88, 112, and 141⅓ counts per control period for levels 8, 9 and 10, respectively. If the maximum count has been reached, Block 372 is bypassed, leaving the HEC count unchanged, and POL is set (Block 362).

If the heating element is being operated at one of power levels 11-15, this routine is entered at entry point HECMD. Inquiry 374 determines whether the maximum count for these power levels of 8192 has been reached. If not, the HEC is incremented by 2 (Block 376), and the POL is set (Block 362). This increments the HEC at an effective rate of 128, 160, 192, 224 and 256 counts per control period for levels 11, 12, 13, 14 and 15, respectively. If the maximum count has been reached, Block 376 is bypassed, leaving the count of the HEC unchanged, and POL is set (Block 362).

If the OFF power setting is being implemented, this routine is entered at entry point HECDL (FIG. 18) and Inquiry 377 determines whether the count of HEC is zero. If it is, the program branches (Block 378) to the Level/Exchange Routine at entry point LERA (FIG. 19). If not, the count is decremented by ½ count (Block 379). This decrements the HEC at a rate of 64 counts per control period. Inquiry 380 determines whether the count has decreased below 6144, the threshold count for HEL2, the Heater Engery Latch which enables the Fast-Cool mode when set. If not, HEL1 is reset (Block 381) and the program branches (Block 378) to the Level-Exchange Routine at entry point LERA (FIG 19). If the count is less than 6144, HEL2 is reset (Block 381) and Inquiry 382 determines whether the count has decreased below 4096, the threshold count for HEL1, the Heater Energy Latch which enables the Fast-Heat mode when reset. If not, the program branches (Block 378) to the Level-Exchange Routine at entry point LERA (FIG. 19). If the count is less than 4096, HEL1 is reset (Block 383) and Inquiry 384 determines whether the count has decreased below 256, the threshold count for HEL0, the Heater Energy Latch which when set enables energization of the Hotlight. If not, the program branches (Block 378) to the Level-Exchange Routine at entry point LERA (FIG. 19). If the count is less than 256, HEL0 is reset (Block 386) and the program branches (Block 378) to the Level-Exchange Routine at entry point LERA (FIG. 19).

Referring again to FIG. 17 for the non-OFF power settings, after having set the POL Latch (Block 362), the program then determines which, if any, of the transient mode control latches controlled by the Heater Energy Counter should be set, thereby carrying out the function of Counter Compare Means 86 of FIG. 4. Inquiry 390 determines whether the HEC count is greater than or equal to the Hot Light threshold count of 256. If not, the program branches (Block 392) to the Level Exchange Routine at Entry Point LERB, FIG. 19. If it is, the Hot Light Latch (HEL0) is set (Block 394). Inquiry 396 then determines if the HEC count is greater than or equal to the Fast-Heat Latch threshold count of 4096. If not, the program branches (Block 392) to LERB, FIG. 19. If so, HEL1 is set (Block 398). Inquiry 400 determines whether the HEC count is greater than or equal to the Fast-Heat threshold count of 6144. If not, the program branches (Block 392) to the Level-Exchange Routine at entry point LERB (FIG 19). If so, HEL2 is set (Block 402) and the program branches (Block 392) to LERB, FIG. 19.

(h) LEVEL-EXCHANGE ROUTINE—FIG. 19

The function of the Level-Exchange Routine is to reset the Power On Latch if the element is not to be energized during the next control interval as determined by the Power Compare Routine; if the heating element is being operated in one of the transient modes, Instant On, Fast-Heat or Fast-Cool, to re-exchange the values of M(KB) and MKB to restore the actual power level setting selected to the M(KB) memory location for the beginning of the next pass through the control routine.

If the heating element is not to be energized during the ensuing control interval, this routine is entered at entry point LERA, and the Power On Latch (POL) is reset (Block 404). If the heating element is to be energized during the ensuing control interval, the routine is entered at entry point LERB, bypassing Block 404. Inquiries 406, 408 and 410 determine whether the Instant On, Fast-Heat and Fast-Cool Latches, respectively, are set. If so, it is necessary to place the actual power setting selected by the user back in memory location M(KB). This is accomplished by Block 412. If none of these latches is set, the actual setting is already in M(KB) and Block 412 is bypassed. The program then branches (Block 414) to the Hotlight Routine, FIG. 20.

Figure 20:
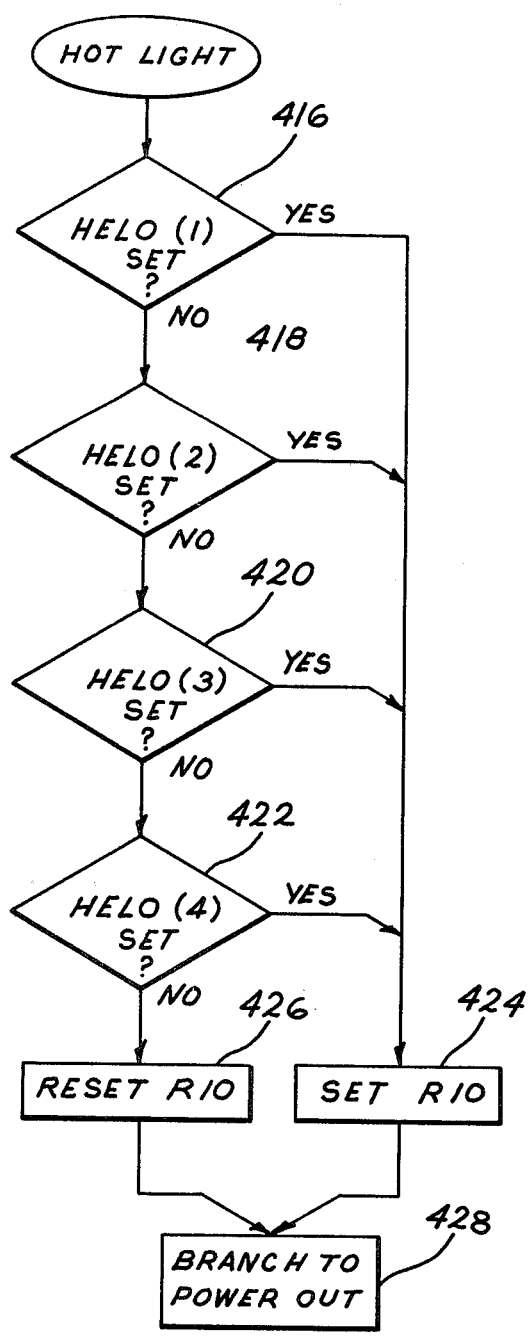
FIG. 20 is a flow diagram of the HOTLIGHT routine incorporated in the control program for the microprocessor in the circuit of FIG. 7.

(i) HOTLIGHT ROUTINE—FIG. 20

The function of this routine is to generate the output signal at output port R10 for controlling energization of the Hotlight. Output port R10 is coupled to LED 32 via driver circuit 120. It will be recalled that the Hotlight is to be energized if one or more of the heating elements is hot, as indicated by the Heater Energy Counter.

Inquiries 416, 418, 420 and 422 check the state of the Hotlight Latch, designated HEL0(n) for n=1-4. The n index associates each latch with one of heating elements 12-18 for n=1-4, respectively. If the answer is yes to any of these inquiries, R10 is set, thereby energizing the Hotlight. If the HEL0 latches for all four heating elements are reset, indicating that the count of the Heater Energy Counter for each of the elements indicates a temperature less than the Hotlight threshold temperature, R10 is reset (Block 426), thereby deenergizing the Hotlight. The program then branches (Block 428) to the Power Out Routine, FIG. 21.

Figure 21:
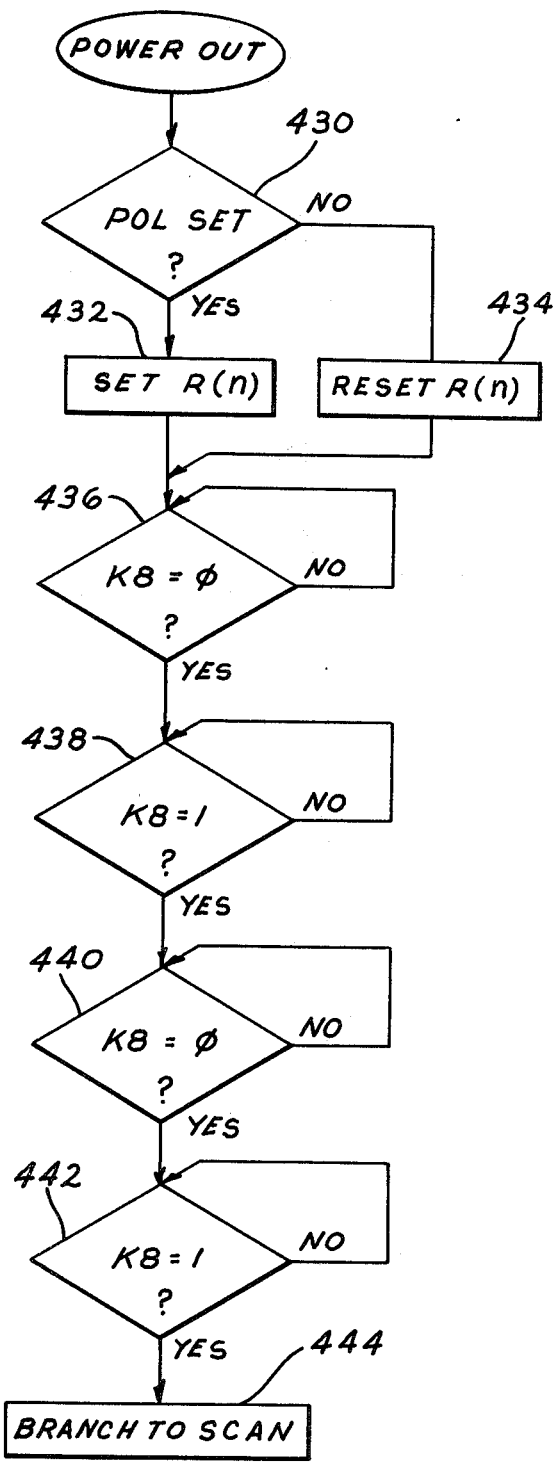
FIG. 21 is a flow diagram of the POWER OUT routine incorporated in the control program for the microprocessor in the circuit of FIG. 7.

(j) POWER OUT ROUTINE—FIG. 21

The function of this routine is to generate the output signals at output ports R4-R7 for controlling relays RL1-RL4, respectively. Inquiry 430 checks the state of the Power Out Latch (POL). If set, the output port R(n) is set (Block 432). The index n identifies the output port associated with the particular heating element routine being executed. For heating elements 12-18, the associated output ports are R4-R7, respectively. Thus, for the routines for heating elements 12-18, index n equals 4-7, respectively. When R4 is set, relay control RL1(a) and RL1(b) are closed, enabling energization of the heating element 12. If the POL is not set for heating element 12, output port R4 is reset (Block 434), thereby opening contacts RL1(a) and RL1(b) and deenergizing heating element 12.

Inquiries 436, 438, 440 and 442 check the state of port K8 to introduce a delay of two cycles of the power signal. Input port K8 receives zero crossing signals from circuit 103 (FIG. 7). Positive half-cycles are represented by K8=1 and negative half-cycles by K8=0. Following this delay the program branches (Block 444) to the Scan Routine for the next heating element. Thus, the control routine for each heating element is executed once every eight cycles of the power signal to provide the desired eight-cycle control interval for each heating element.

While in accordance with the Patent Statues, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In a household cooking appliance, a power control system for controlling the power output of a heating element energized by an external power supply in response to a power setting selected by an operator from a plurality of available power settings, said control system comprising:

power control means for operating the heating element at different selected power levels in response to the selection of different ones of the power settings;

energy counter means;

counter control means for selectively incrementing said energy counter means at one of a plurality of increment rates, each of which is approximately proportional to the rate of increase of the heating element temperature as the element temperature increases from ambient temperature to its steady state operating temperature when operated at corresponding power levels, said one rate being selected according to the power level at which the heating element is being operated; said counter control means being further operative to discontinue incrementing the energy counter means when the count reaches a preselected one of a plurality of maximum counts, each of said plurality of maximum counts being approximately proportional to the steady state heating element temperature for corresponding power levels, said one maximum count being selected according to the selected power setting; said counter control means being further operative to decrement said energy counter means at a predetermined rate when an OFF power setting is selected, said predetermined rate being approximately proportional to the rate of decrease of the heating element temperature when the heating element is deenergized; and means for detecting a change in the power setting;

said power control means including transient means responsive to said detecting means and said energy counter means for operating said heating element at a power level higher than the operator selected power level for a first relatively short period of time in response to a change from one power level to a relatively higher power level when said count of said energy counter is less than a first predetermined reference value, said first reference value corresponding to a fast-heat threshold temperature, whereby the response time required for the heating element temperature to reach the operating temperature associated with the new power setting is reduced.

2. A power control system in accordance with claim 1 wherein said fast-heat period of time prior to operating said heating element at said selected power level is of a first predetermined duration.

3. A power control system in accordance with claim 2 wherein said fast-heat power level is a predetermined number of levels higher than the selected power level or the maximum power level, if the difference in level between the selected level and the maximum level is less than said predetermined number of levels.

4. A power control system in accordance with claims 1 or 2 or 3 wherein said means for operating said heating element further includes:

fast cool means for operating said heating element at a fast-cool power level lower than the selected power level for a relatively short fast-cool period of time prior to operating the heating element at the selected power level in response to a change from one power setting to a relatively lower power setting when said count of said energy counter is greater than a predetermined fast-cool reference value, said fast-cool reference value corresponding to a fast-cool threshold temperature.

5. A power control system in accordance with claim 4 wherein said fast-cool period of time is of a second predetermined duration.

6. A power control system in accordance with claim 5 wherein said fast-cool power level is a predetermined number of power levels lower than the selected power level or, the OFF power level, in response to the difference in level between the selected level and the OFF level being less than said predetermined number of levels lower than the selected power level.

7. A power control system for controlling power to a heating element in response to selection by an operator of one of a plurality of power settings, said control system comprising:

power control means for operating the heating element at different power levels in response to the selection of different ones of the power settings;

energy counter means;

counter control means for selectively incrementing said energy counter means at one of a plurality of increment rates, each of which is approximately proportional to the rate of increase of the heating element temperature from ambient temperature to steady state operating temperature when the element is operated at a corresponding power level, said one increment rate being selected according to the selected power setting; said counter control means being further operative to discontinue incrementing said energy counter means when said count at least equals a selected one of a plurality of maximum counts each of which is approximately proportional to the steady state heating element temperature for corresponding power settings, said selected one maximum count being selected according to the selected power setting;

means for detecting changes in the selected power setting;

said power control means including transient control means responsive to said detecting means and said energy counter means and operative in response to a change to a higher power setting to operate the heating element at a power level higher than the selected power level for a relatively short period of time prior to operating the heating element at the newly selected power setting if the count of said energy counter is less than a first predetermined reference value signifying a heating element temperature less than a first predetermined temperature, and operative in response to a change to a lower power setting to operate the heating element at a power level lower than the selected power level for a second predetermined period prior to operating the heating element at the selected power level if the count of said energy counter is above a second predetermined reference value, signifying a heating element temperature greater than a second predetermined temperature, thereby reducing the response time required for the heating element to reach the steady state operating temperature corresponding to the newly selected power setting.

8. The control system of claim 7 wherein said transient control means is operative to operate the heating element at the higher power level in response to a change to a higher power setting when the count of said energy counter is less than a first predetermined reference value and the higher power setting is higher than a predetermined relatively low setting.

9. The control arrangement of claim 7 or 8 wherein said transient control means is operative to operate the heating element at the lower power level in response to a change from one power setting to a lower power setting when the count of said energy counter is greater than said second reference value and the lower power setting is lower than a predetermined relatively high power setting.

10. A method for controlling the power output of a resistive heating element energized by an external power supply in response to a power setting selected by an operator from a plurality of available power settings which reduces the time required for the heating element to respond to changes in the power setting comprising the steps of:

detecting a change in power setting;

incrementing an energy counter at a rate determined by the power level applied to the heating element independent of the actual heating element temperature, the rate being approximately proportional to the rate of increase of the heating element temperature from ambient temperature to steady state temperature when the heating element is operated at that power level;

discontinuing incrementing the energy counter when the count at least equals a predetermined maximum count which is approximately proportional to the steady state temperature of the heating element when operated at the selected power level;

operating the heating element at a power level higher than the selected power level for a first predetermined time following a change to a higher power setting whenever the count of the energy counter is less than a first predetermined count;

operating the heating element at a power level lower than the selected power level for a second predetermined period of time following a change to a lower power setting whenever the count of the energy counter is greater than a second predetermined count; and operating the heating element at the selected power level upon expiration of the first or second predetermined times following changes to higher or lower power settings, respectively.

11. A method for controlling the power output of a resistive heating element energized by an external power supply in response to a power setting selected by an operator from a plurality of available power settings which reduces the time required for the heating element to respond to changes in the power setting comprising the steps of:

detecting a change in power setting;

incrementing an energy counter at a rate determined by the power level applied to the heating element independent of the actual heating element temperature, the rate being approximately proportional to the rate of increase of the heating element temperature from ambient temperature to steady state temperature when the heating element is operated at power level;

discontinuing incrementing the energy counter when the count at least equals a predetermined maximum count which is approximately proportional to the steady state temperature of the heating element when operated at the selected power level;

operating the heating element at a power level higher than the selected power level for a first predetermined time following a change to a higher power setting whenever the count of the energy counter is less than a first predetermined count and the selected power level is higher than a predetermined relatively low power level;

operating the heating element at a power level lower than the selected power level for a second predetermined period of time following a change to a lower power setting whenever the count of the energy counter is greater than a second predetermined count and the selected power level is lower than a predetermined relatively high power level; and operating the heating element at the selected power level upon expiration of the first or second predetermined times following changes to higher or lower power settings, respectively.

12. In a household cooking appliance, a power control system for controlling the power output of a heating element energized by an external power supply in response to a power setting selected by an operator from a plurality of available power settings, said control system comprising:

power control means for operating the heating element at different selected power levels in response to the selection of different ones of the power settings;

energy counter means;

counter control means for selectively incrementing said energy counter means at one of a plurality of increment rates, each of which is approximately proportional to the rate of increase of the heating element temperature as the element temperature increases from ambient temperature to its steady state operating temperature when operated at corresponding power levels, said one rate being selected according to the power level at which the heating element is being operated; said counter control means being further operative to discontinue incrementing the energy counter means when the count reaches a preselected one of a plurality of maximum counts, each of said plurality of maximum counts being approximately proportional to the steady state heating element temperature for corresponding power levels, said one maximum count being selected according to the selected power settings, said counter control means being further operative to decrement said energy counter means at a predetermined rate when an OFF power setting is selected, said predetermined rate being approximately proportional to the rate of decrease of the heating element temperature when the heating element is deenergized; and means for detecting a change in the power setting;

said power control means including transient means responsive to said detecting means and said energy counter means for operating said heating element at a transient power level lower than the operator selected power level for a relatively short period of time prior to operating the heating element at the selected power level in response to a change from one power setting to a relatively lower power setting when said count of said energy counter is greater than a predetermined reference value, said reference value corresponding to a fast-cool threshold temperature.

13. A power control system in accordance with claim 12 wherein said transient power level is a predetermined number of power levels lower than the selected power level or, the OFF power level in response to the difference in level between the selected level and the OFF level being less than said predetermined number of levels lower than the selected power level.

\* \* \* \* \*